United States Patent
Kliuchnikov et al.

(10) Patent No.: US 12,481,909 B2
(45) Date of Patent: Nov. 25, 2025

(54) LOWER-BOUNDING DISTANCE OF STABILIZER CHANNEL SEQUENCE

(71) Applicant: Microsoft Technology Licensing, LLC, Redmond, WA (US)

(72) Inventors: Vadym Kliuchnikov, Redmond, WA (US); Michael Edward Beverland, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/536,011

(22) Filed: Dec. 11, 2023

(65) Prior Publication Data
US 2025/0190837 A1    Jun. 12, 2025

(51) Int. Cl.
*G06N 10/70* (2022.01)

(52) U.S. Cl.
CPC .................................. *G06N 10/70* (2022.01)

(58) Field of Classification Search
CPC ..................................................... G06N 10/70
See application file for complete search history.

(56) References Cited

U.S. PATENT DOCUMENTS

| | | | |
|---|---|---|---|
| 9,978,020 B1 | 5/2018 | Gambetta et al. | |
| 11,853,159 B1 | 12/2023 | Chamberland | |
| 11,901,915 B1 | 2/2024 | Campbell | |
| 2014/0365843 A1 | 12/2014 | Ashikhmin | |
| 2019/0266512 A1* | 8/2019 | Shen | G06N 10/70 |
| 2021/0125096 A1* | 4/2021 | Puri | G06N 10/70 |
| 2022/0271847 A1* | 8/2022 | Bucklew | H04B 10/508 |
| 2024/0160988 A1 | 5/2024 | Barber | |
| 2024/0303521 A1 | 9/2024 | Gimeno-Segovia | |
| 2024/0354630 A1 | 10/2024 | Lee | |

OTHER PUBLICATIONS

A. Mondal and K. K. Parhi, "Optimization of Quantum Circuits for Stabilizer Codes," in IEEE Transactions on Circuits and Systems I: Regular Papers, vol. 71, No. 8, pp. 3647-3657, Aug. 2024, (Year: 2024).*

(Continued)

*Primary Examiner* — Cynthia Britt
(74) *Attorney, Agent, or Firm* — Alleman Hall & Tuttle LLP

(57) ABSTRACT

A computing system including one or more processing devices configured to receive a stabilizer channel sequence of three or more stabilizer channels and respective fault sets. The one or more processing devices compute a lower-bound channel distance of the stabilizer channel sequence at least in part by computing lower-bound channel distances of compositions of adjacent pairs of stabilizer channels. For a stabilizer channel and a plurality of partition timestep counts, computing the lower-bound channel distance further includes receiving an indication of whether there exists a partition of the fault set of that stabilizer channel that has that partition timestep count and for which the stabilizer channel is time-local. Computing the lower-bound channel distance further includes selecting a lowest value among the lower-bound channel distances of the compositions and each of the partition timestep counts that has a time-locality-satisfying partition. The one or more processing devices output the lower-bound channel distance.

20 Claims, 17 Drawing Sheets

(56) References Cited

OTHER PUBLICATIONS

International Search Report and Written Opinion received for PCT Application No. PCT/US2024/057123, Feb. 26, 2025, 19 pages.

Noh, et al., "Low overhead fault-tolerant quantum error correction with the surface-GKP code", arXiv:2103.06994v2, Jan. 29, 2022, 42 Pages.

Non-Final Office Action mailed on Feb. 24, 2025, in U.S. Appl. No. 18/536,051, 6 pages.

Notice of Allowance mailed on Jun. 13, 2025, in U.S. Appl. No. 18/536,051 8 pages.

Pato, et al., "Optimization Tools for Distance-Preserving Flag Fault-Tolerant Error Correction", arXiv:2306.12862v2, vol. 05, Issue No. 2, Aug. 21, 2023, 28 Pages.

Yoder, T J, et al., "The Surface Code with a Twist", Department of Physics, Massachusetts Institute of Technology, Mar. 2017, 19 pages.

* cited by examiner

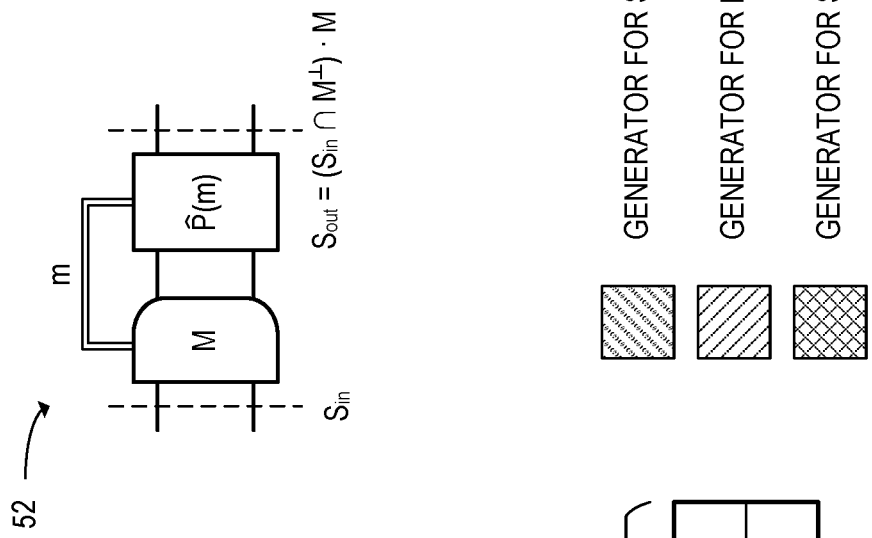
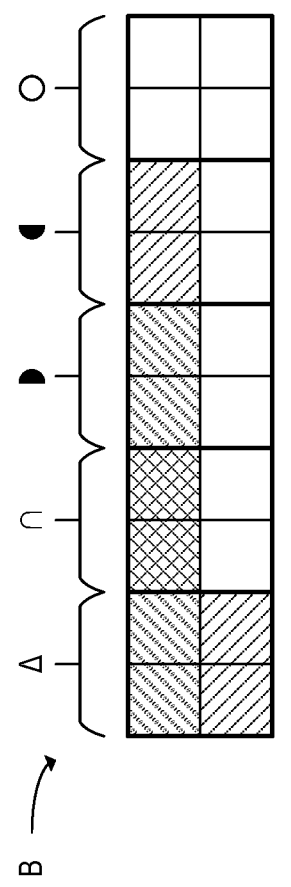
FIG. 4A
FIG. 4B
FIG. 4C

300 ⤴

| Minimum weight non-trivial cycle |
|---|
| Input: Undirected graph $G = (V, E)$ with edge weights $w : E \to \mathbb{R}^{>0}$, error map $r : E \to \mathbb{F}_2^m$. |
| Output: Minimum weight of a cycle $\tilde{C} \subset E$ in $G$ that has non-zero error $\sum_{e \in C} r(e)$ |
| 1: $w_{min} \leftarrow \infty$ |
| 2: for $v \in V$ do |
| 3:     Solve Single Source Shortest Paths problem for $G, w$, with source $v$ and paths weight less than $w_{min}$ |
| 4:     Let $W(u)$ be the shortest distance from $v$ to $u$ |
| 5:     Let $V'$ be $V - \{v\}$ ordered so that the shortest distance to $v$ is non-decreasing |
| 6:     Let $R : V \to \mathbb{F}_2^m$ be undefined errors |
| 7:     $R(v) \leftarrow 0$ |
| 8:     for $v' \in V'$ while $W(v') < w_{min}/2$ do |
| 9:         for neighbours $u$ of $v'$ do |
| 10:             if $W(u) + w(u, v') = W(v')$ then |
| 11:                 if $R(v')$ is undefined then |
| 12:                     $R(v') \leftarrow R(u) + r(u, v')$ |
| 13:                 else |
| 14:                   if $R(v') \neq R(u) + r(u, v')$ then |
| 15:                       $w_{min} \leftarrow \min(w_{min}, 2W(v'))$ |
| 16:         for neighbours $u$ of $v'$ do |
| 17:             if $W(u) + w(u, v) \neq W(v')$ then |
| 18:                 if $R(u)$ defined then |
| 19:                   if $R(u) + r(u, v') \neq R(v')$ then |
| 20:                     $w_{odd\ cycle} \leftarrow W(u) + W(v') + w(u, v')$ |
| 21:                     $w_{min} \leftarrow \min(w_{min}, w_{odd\ cycle})$ |
| 22: return $w_{min}$ |

FIG. 11

LOWER-BOUNDING DISTANCE OF STABILIZER CHANNEL SEQUENCE

BACKGROUND

Large-scale quantum computers built from imperfect hardware require some form of fault tolerance. The vast majority of approaches that have been considered to build fault tolerant quantum computation rely on protecting information by storing it in stabilizer codes. The computation proceeds by applying faulty circuits on the hardware that, with appropriate classical processing to identify and correct faults, reliably apply logical operations to the encoded states.

A fault-tolerant circuit that implements a logical operation while mapping between stabilizer codes is referred to as a channel. Channels fall into two classes: stabilizer channels, which are implemented by stabilizer operations (preparations and measurements in the Pauli bases, along with Clifford unitaries) and non-stabilizer channels, which also make use of some non-stabilizer operations. For example, the non-stabilizer channels may use non-stabilizer operations to produce encoded magic states.

The class of stabilizer channels is ubiquitous in the field of quantum error correction (QEC). A wide range of fault tolerance techniques are typically defined in terms of stabilizer circuits, such as stabilizer extraction, lattice surgery, code deformation, and transverse Clifford gate approaches to QEC. Considering explicit circuit implementations, the class of stabilizer circuits also includes many logical operations that are more commonly considered from a topological viewpoint, such as braiding punctures and braiding twist defects. In addition, since Pauli-based subsystem codes and Floquet codes have information encoded in a stabilizer code at each moment in time, stabilizer channels also include fault-tolerant error correction and most logical gates for these more exotic code families.

SUMMARY

According to one aspect of the present disclosure, a computing system is provided, including one or more processing devices configured to receive a stabilizer channel sequence for use with a quantum computing device. The stabilizer channel sequence includes three or more stabilizer channels. The one or more processing devices are further configured to receive respective fault sets associated with the stabilizer channels. The one or more processing devices are further configured to compute a lower-bound channel distance of the stabilizer channel sequence at least in part by computing respective lower-bound channel distances of a plurality of compositions of adjacent pairs of stabilizer channels in the stabilizer channel sequence. For at least one stabilizer channel of the three or more stabilizer channels, for each of a plurality of partition timestep counts, computing the lower-bound channel distance further includes receiving an indication of whether there exists a time-locality-satisfying partition of the fault set of that stabilizer channel that has that partition timestep count and for which the stabilizer channel is time-local. Computing the lower-bound channel distance further includes selecting, as the lower-bound channel distance of the stabilizer channel sequence, a lowest value among the plurality of lower-bound channel distances of the compositions and each of the partition timestep counts that has a respective time-locality-satisfying partition. The one or more processing devices are further configured to output the lower-bound channel distance.

According to another aspect of the present disclosure, a computing system is provided, including one or more processing devices configured to identify one or more severe hook faults in a stabilizer channel configured to be implemented at a quantum computing device. Identifying the one or more severe hook faults includes receiving a circuit channel check matrix of the stabilizer channel. The columns of the circuit channel check matrix indicate values of checks associated with respective elementary faults of the stabilizer channel. Identifying the one or more severe hook faults further includes receiving a phenomenological channel check matrix of the stabilizer channel as a sub-matrix of the circuit channel check matrix. Identifying the one or more severe hook faults further includes receiving a logical effect matrix of the stabilizer channel. Identifying the one or more severe hook faults further includes receiving a weight vector that indicates respective probability weights of the elementary faults. Based at least in part on the circuit channel check matrix, the logical effect matrix, the phenomenological channel check matrix, and the weight vector, identifying the one or more severe hook faults further includes computing one or more column indices of respective columns of the circuit channel check matrix that correspond to the one or more severe hook faults. The one or more processing devices are further configured to output an indication of the one or more severe hook faults.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4A schematically shows an example of an elementary code deformation step, according to the example of FIG. 1.

FIG. 4B schematically shows a phase-fixed code deformation step that includes a Pauli correction, according to the example of FIG. 4A.

FIG. 4C schematically shows a common symplectic Pauli basis that may be used to define the Pauli correction, according to the example of FIG. 4B.

FIG. 11 schematically shows an algorithm for computing a minimum-weight cycle of a syndrome graph that has nonzero error, according to the example of FIG. 1.

DETAILED DESCRIPTION

As quantum computing hardware advances, it is becoming increasingly important to make high-level descriptions of fault-tolerant circuits more explicit and to verify that circuits are fault tolerant with respect to more specific noise models. By moving from simple phenomenological models of noise to more explicit models of circuit noise, more accurate overhead estimates for different fault tolerance schemes may be developed. These overhead estimates may accordingly allow a developer to select an appropriate fault tolerance scheme for a quantum computing device. In some cases, specifying circuit details may highlight practical limitations of certain fault tolerance schemes (e.g., boundaries are problematic for the existing proposals for biased surface codes).

Various approaches have been developed to determine whether a given stabilizer channel is fault-tolerant when used to perform some computing task. Some of these approaches are high-level, such as determination of asymptotic scaling results. Other such approaches are idealized. For example, these idealized approaches may consider a stabilizer channel in isolation, with a perfect input state, and without considering the application of multiple noisy channels in sequence. Further approaches are purely numerical, sampling noise events at random without proving correctness.

The shortcomings of previous stabilizer channel fault-tolerance determination approaches motivate the following goals for a stabilizer channel assessment approach:

1) providing a clear-cut definition for determining whether a stabilizer channel is fault-tolerant or not with respect to a given noise model;
2) providing tools with which, when a stabilizer channel is not fault-tolerant, the causes of that lack of fault-tolerance may be diagnosed; and
3) guiding modifications to current designs of stabilizer channels in order to increase the fault-tolerance of those designs.

Figure 1:
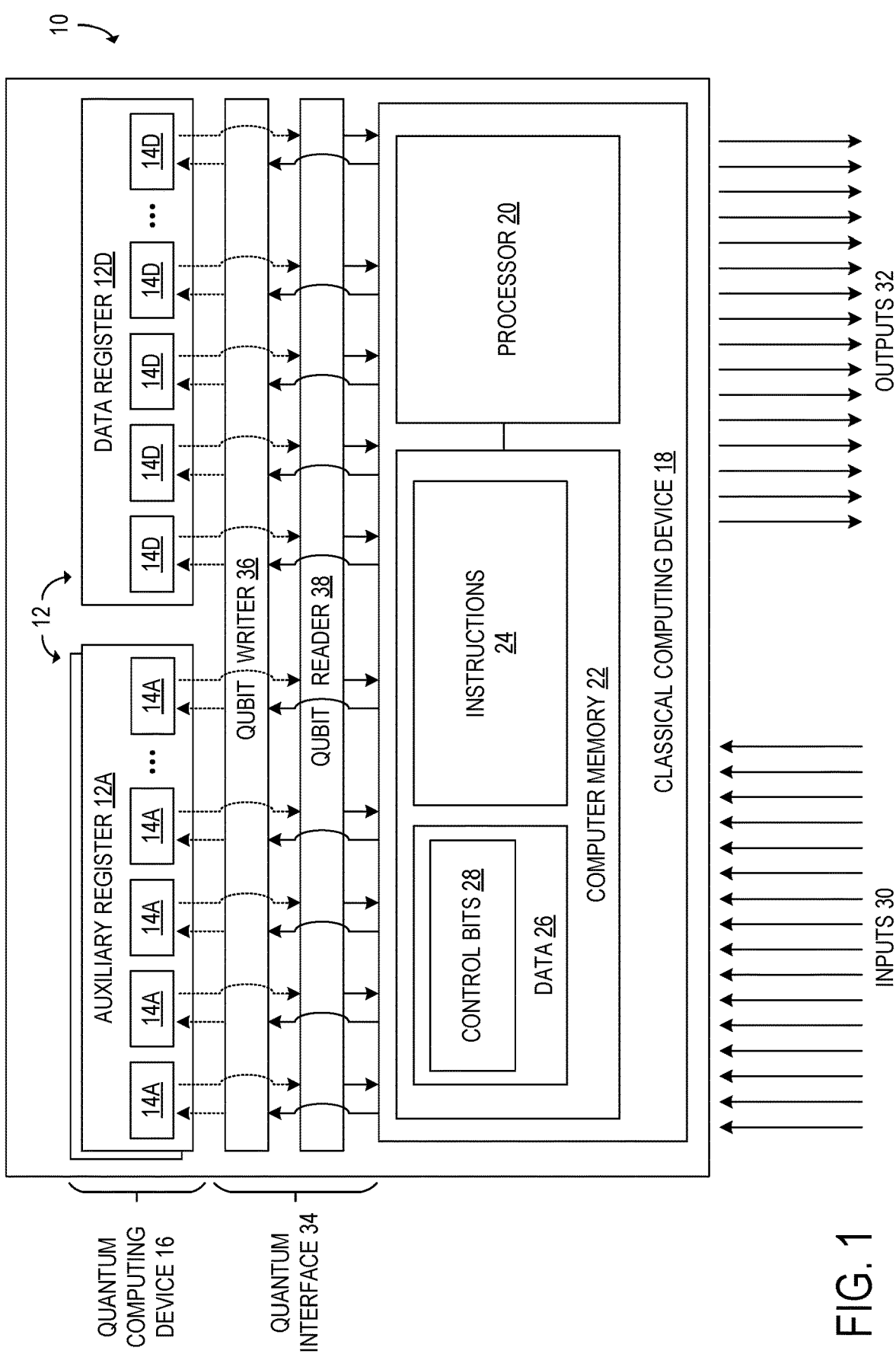
FIG. 1 schematically shows a computing system including a quantum computing device and a classical computing device, according to one example embodiment.

In order to achieve the above goals and address the shortcomings of previous stabilizer channel assessment approaches, a computing system 10 is provided, as shown in the example of FIG. 1. The computing system 10 includes quantum computing device components configured to execute quantum-logic operations. Whereas conventional computer memory holds digital data in an array of bits and enacts bit-wise logic operations, a quantum computer holds data in an array of qubits and operates quantum-mechanically on the qubits in order to implement the desired logic. Accordingly, the computing system 10 includes a set of qubit registers 12. For example, the set of qubit registers 12 may include a data register 12D and an auxiliary register 12A. Each qubit register includes a plurality of qubits 14. The data register 12D includes a plurality of data qubits 14D, and the auxiliary register 12A includes a plurality of auxiliary qubits 14A. The plurality of qubit registers 12 are included in a quantum computing device 16 that is configured to communicate with a classical computing device 18 via a quantum interface 34.

The qubits 14 included in each qubit register 12 may take various forms, depending on the desired architecture of quantum computing device 16. For example, each of the qubits 14 may be a superconducting Josephson junction, a trapped ion, a trapped atom coupled to a high-finesse cavity, an atom or molecule confined within a fullerene, an ion or neutral dopant atom confined within a host lattice, a quantum dot exhibiting discrete spatial- or spin-electronic states, an electron hole in a semiconductor junction entrained via an electrostatic trap, a coupled quantum-wire pair, an atomic nucleus addressable by magnetic resonance, a free electron in helium, a molecular magnet, or a metal-like carbon nanosphere. As additional examples, a qubit 14 may be implemented in the plural processing states corresponding to different modes of light propagation through linear optical elements (e.g., mirrors, beam splitters and phase shifters), as well as in states accumulated within a Bose-Einstein condensate. More generally, each qubit 14 may comprise any particle or system of particles that can exist in two or more discrete quantum states that can be measured and manipulated experimentally.

The computing system 10 further includes a classical computing device 18. The classical computing device 18 may include at least one processor 20 and associated computer memory 22. The processor 20 may be coupled operatively to peripheral componentry, such as network componentry, to enable the quantum computing device 16 to be operated remotely. The processor 20 may include one or more central processing units (CPUs), graphics processing units (GPUs), and/or other classical processing devices. The computer memory 22 may be configured to hold program instructions 24 that cause the processor 20 to execute any function or process of classical computing device 18. The computer memory 22 may also be configured to hold additional data 26. In some examples, the additional data 26 may include a register of classical control bits 28 that influence the operation of the quantum computing device 16 during runtime, for example, to provide classical control input to one or more quantum-gate operations.

In examples in which the qubit registers 12 are low-temperature or cryogenic devices, the classical computing device 18 may include control componentry operable at low or cryogenic temperatures, such as a field-programmable gate array (FPGA) operated at 77K. In such examples, the low-temperature control componentry may be coupled operatively to interface componentry operable at normal temperatures.

The classical computing device 18 is configured to receive a plurality of inputs 30 and to provide a plurality of outputs 32. The inputs 30 and outputs 32 may each comprise digital and/or analog lines. At least some of the inputs 30 and outputs 32 may be data lines through which data is provided to and/or extracted from the quantum computing device 16. Other inputs may comprise control lines via which the operation of the quantum computing device 16 may be adjusted or otherwise controlled.

The classical computing device 18 is operatively coupled to the qubit registers 12 via the quantum interface 34. The quantum interface 34 is configured to exchange data (solid lines) bidirectionally with the classical computing device 18. The quantum interface 34 is further configured to exchange signals associated with the data (dashed lines) bidirectionally with the qubit registers 12. Depending on the physical implementation of the qubits 14, such signals may include electrical, magnetic, and/or optical signals. Via the signals conveyed through the quantum interface 34, the classical computing device 18 may interrogate and otherwise influence the quantum state held in any, some, or all of the qubit registers 12, as defined by the collective quantum state of the qubits 14 therein. To that end, the quantum interface 34 includes a qubit writer 36 and a qubit reader 38. The qubit writer 36 is configured to output a signal to one or more qubits 14 of a qubit register 12 based at least in part on write data received from the classical computing device 18. The qubit reader 38 is configured to sense a signal from one or more qubits 14 of a qubit register 12 and to output read data to the classical computing device 18 based at least in part on the signal. The read data received from the qubit reader 38 may be an estimate of an observable obtained by measuring the quantum state held in a qubit register 12. Taken together, the classical computing device 18 and the quantum interface 34 form a control system of the quantum computing device 16.

In some examples, a suitably configured signal from qubit writer 36 may interact physically with one or more qubits 14 of a qubit register 12 to trigger measurement of the quantum state held in the one or more qubits 14. Qubit reader 38 may then sense a resulting signal released by the one or more qubits 14 pursuant to the measurement and may output read data corresponding to the resulting signal to classical computing device 18. In one non-limiting example, the qubit writer 36 may provide, based on data from the classical computing device 18, an appropriate voltage pulse or pulse train to an electrode associated with one or more qubits 14 in order to initiate a measurement. In such examples, the qubit reader 38 may sense photon emission from the one or more qubits 14 and may assert a corresponding digital voltage level on a quantum-interface line into the classical computing device 18. Generally speaking, any measurement of a quantum-mechanical state is defined by the operator O corresponding to the observable to be measured; the result R of the measurement is guaranteed to be one of the allowed eigenvalues of 0.

Pursuant to appropriate input from the classical computing device 18, the quantum interface 34 may be configured to implement one or more quantum-logic gates to operate on the quantum state held in a qubit register 12. The term "state vector" refers herein to the quantum state held in the series of data qubits 14D of the data register 12D of the quantum computing device 16. The function of each type of quantum gate is described by a corresponding operator, which may be represented as an operator matrix. The operator matrix operates on the complex vector representing a qubit register state and effects a specified rotation of that vector in Hilbert space. In some examples, in order to implement an operator O, the qubit writer 36 may apply a predetermined signal level for a predetermined duration. In some examples, multiple signal levels may be applied for corresponding sequenced or otherwise associated durations.

The terms "quantum circuit" and "quantum algorithm" are used herein to describe a predetermined sequence of elementary quantum-gate and/or measurement operations executable by computing system 10. A quantum circuit may be used to transform the quantum state of a qubit register 12 to perform a classical or non-elementary quantum-gate operation or to apply a density operator, for example. In some examples, a quantum circuit may be used to enact a predefined operation $f(x)$, which may be incorporated into a complex sequence of operations.

As discussed above, measurement of the quantum state of a physical qubit may be subject to error. Accordingly, any qubit 14 may be implemented as a logical qubit, which includes a grouping of physical qubits measured according to an error-correcting quantum algorithm or circuit that reveals the quantum state of the logical qubit with above-threshold confidence.

Formalism and terminology related to stabilizer codes are provided below. In the following discussion, for Pauli operators A and B, the commutator ⟦A, B⟧ =0 when A and B commute, and the commutator ⟦A, B⟧ =1 when A and B do not commute. In addition, $H^\perp$ is used to denote the set of Pauli operators that commute with all elements of a Pauli operator set H.

When P|ψ⟩=|ψ⟩ for a Pauli operator P and a quantum state |ψ⟩, the Pauli operator P stabilizes the state |ψ⟩. A group of commuting operators $\mathcal{S}$ stabilizes a state |ψ⟩ if all elements of $\mathcal{S}$ stabilize |ψ⟩. Thus, $\mathcal{S}$ is referred to as a stabilizer group for |ψ⟩. An Abelian Pauli group $\mathcal{S}$ specifies a stabilizer code, where the codespace of $\mathcal{S}$ includes the states that are stabilized by $\mathcal{S}$.

Given a Pauli group G and a Pauli operator P, the notation PG denotes the set PG={Pg|g∈G}. In addition, given a pair of Pauli groups G and H, the notation GH denotes the set GH={gH|g∈G}.

For measurement of Hermitian Pauli operators, the convention used herein labels possible outcomes by 0 and 1. The addition of measurement outcomes and sets of measurement outcomes is considered in some of the examples provided below. This addition is performed modulo two unless otherwise stated.

A stabilizer circuit is defined herein as a quantum circuit $\mathcal{C}$ built from the following set of stabilizer operations:
Input and output of qubits in arbitrary states (including non-stabilizer states);
Preparations of qubits in the computational basis;
Non-destructive measurements of Pauli operators;
Destructive measurements of single-qubit Pauli operators;
Clifford unitaries;
The generation of classical random bits; and
Conditional Pauli operations controlled on the parities of prior measurement outcomes and random bits.

In the above definition, Pauli operators are defined as members of the Pauli group, which is defined as follows in the n-qubit case:

$$P_n = \left\{ e^{\frac{i\theta\pi}{2}} \sigma_{j_1} \otimes \ldots \otimes \sigma_{j_n} | \theta = 0, 1, 2, 3, j_k = 0, 1, 2, 3 \right\}$$

where $\sigma_0, \ldots \sigma_3$ are the one-qubit Pauli matrices. In addition, Clifford unitaries are defined as unitaries that normalize the Pauli group. The group of Clifford unitaries is defined as follows:

$C_n = \{V \in U_{2^n} | VP_n V^\dagger = P_n\}$

In the above equation, $U_{2^n}$ is the set of $2^n$-dimensional unitary matrices.

The operations in a stabilizer circuit $\mathcal{C}$ occur at specified timesteps, with operations on non-overlapping qubits being allowed in the same timestep. The sequence of measurement outcomes and random bits produced by the circuit $\mathcal{C}$ is referred to as the circuit outcome vector. Any stabilizer circuit $\mathcal{C}$ is equivalent to a simple general-form circuit $\mathcal{C}_{gen}$. "Equivalent" in this context means that when both $\mathcal{C}$ and $\mathcal{C}_{gen}$ receive the same input state $|\psi\rangle$, then the state $|\psi'(v)\rangle$ output by $\mathcal{C}$ when its outcome vector is v is the same as the state $|\psi'_{gen}(o)\rangle$ output by $\mathcal{C}_{gen}$ when its outcome vector is o, for some known affine relation between v and o.

Figure 2:
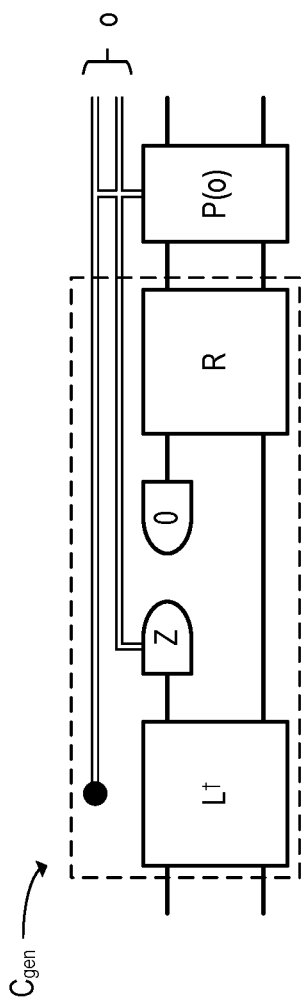
FIG. 2 schematically shows a general-form circuit configured to be executed at the quantum computing device, according to the example of FIG. 1.

The general-form circuit $\mathcal{C}_{gen}$ is schematically depicted in the example of FIG. 2. The general-form circuit $\mathcal{C}_{gen}$ shown in the example of FIG. 2 includes an initial Clifford gate $L^\dagger$, a destructive Z measurement, an ancilla preparation in a 0 state, a final Clifford gate R, and a conditional Pauli gate P(o). The conditional Pauli gate P(o) is controlled by a circuit outcome vector o, which includes random bits (shown as a black disk in FIG. 2) and measurement outcomes. Changing the conditional Pauli gate in $\mathcal{C}$ changes the conditional Pauli gate in $\mathcal{C}_{gen}$ while leaving the portions of the general-form circuit $\mathcal{C}_{gen}$ within the dashed box unchanged. Although the example of FIG. 2 shows the destructive measurement as a destructive Z measurement, the destructive measurement may be some other single-qubit destructive Pauli measurement in some examples. In addition, the ancilla may be prepared in a state other than 0.

The one or more conditional Pauli operators that may be included in the stabilizer circuit, as discussed above in the definition of a stabilizer circuit, are treated differently from other stabilizer operations. In particular, the stabilizer circuit $\mathcal{C}$ is considered to be specified by the other stabilizer operations it includes, and the one or more conditional Pauli operators may be treated as either included in or removed from the stabilizer circuit $\mathcal{C}$. This flexibility as to whether the one or more conditional Pauli operators are included is a consequence of being able to apply the one or more conditional Pauli operators offline (e.g., with a Pauli-frame update), and/or postpone the one or more conditional Pauli operators until the end of the stabilizer circuit $\mathcal{C}$, while leaving the other instructions unchanged. In addition, as discussed above with reference to FIG. 2, changing the conditional Pauli operators in a stabilizer circuit only changes the conditional Pauli operators of an equivalent general-form circuit. The conditional Pauli operators may accordingly be treated as perfect operators even in the presence of noise. However, whether or not the conditional Pauli operators are applied may be flipped by noise that changes the bitstring on which the conditional Pauli operators are controlled.

The stabilizer circuits considered herein are constructed from elements of an explicit instruction set $\mathcal{I}$, with no restriction in the states of the input qubits. The instruction set $\mathcal{I}$ could in principle be the entire set of stabilizer operations, but it is typically further restricted to reflect the capabilities of the hardware platform of the computing system 10. For example, $\mathcal{I}$ may include all single-qubit stabilizer operations and CNOT gates between specified pairs of qubits.

A stabilizer circuit is referred to as a stabilizer channel from an input stabilizer group $\mathcal{S}_{in}$ to an output stabilizer group $\mathcal{S}_{out}$ if, for any input state encoded in $\mathcal{S}_{in}$ and for every possible channel outcome vector, it outputs a state encoded in $\mathcal{S}_{out}$. Accordingly, a stabilizer channel is a group homomorphism from $\mathcal{S}_{in}$ to $\mathcal{S}$ out. In order to make a stabilizer circuit $\mathcal{C}$ satisfy the properties of a stabilizer channel, specific conditional Pauli operators are chosen for inclusion in the stabilizer circuit $\mathcal{C}$.

Figure 3A:
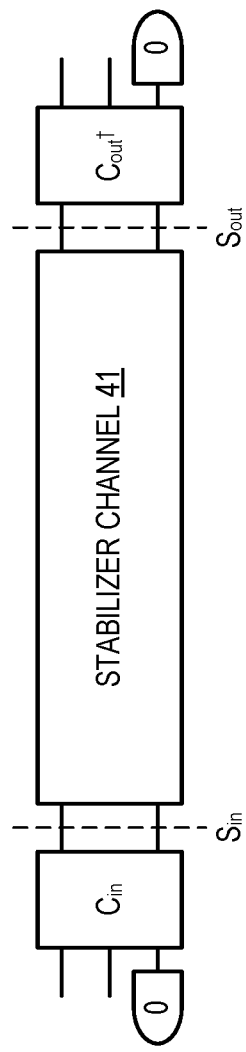
FIG. 3A schematically shows a logical action of a stabilizer channel, according to the example of FIG. 1.

Given a stabilizer channel from $\mathcal{S}_{in}$ to $\mathcal{S}_{out}$, one relevant property of the stabilizer channel is its logical action on the encoded information. To obtain a uniquely defined logical action of the stabilizer channel, explicit logical bases of $\mathcal{S}_{in}$ and $\mathcal{S}_{out}$ are first defined. These logical bases may be defined by providing encoding Clifford unitaries $C_{in}$ and $C_{out}$ of the input and output codes, respectively. FIG. 3A schematically shows the logical action 40 of a stabilizer channel 41, according to one example. In the example of FIG. 3A, the Clifford unitaries $C_{in}$ and $C_{out}$ fix the logical basis of the stabilizer groups $\mathcal{S}_{in}$ and $\mathcal{S}_{out}$.

An encoding Clifford unitary C for a k-qubit stabilizer code $\mathcal{C}$ maps $X_i$ and $Z_i$ for $i \in [k]$ to a basis of logical operator representatives, while the encoding Clifford unitary C also maps $Z_i$ for $i \in [k+1, n]$ to a set of independent stabilizer generators of the stabilizer code $\mathcal{S}$. The logical action of a stabilizer circuit $\mathcal{C}$ can then be succinctly characterized by finding a general form circuit equivalent to the composite stabilizer circuit formed by sandwiching $\mathcal{C}$ between encoding and unencoding Clifford unitaries for the input code, as shown in the example of FIG. 3A.

A Clifford unitary corresponds to a symplectic basis for n qubits, which is given by $CX_1 C^\dagger$, $CZ_1 C^\dagger$, $CX_2 C^\dagger$, $CZ_2 C^\dagger$, ..., $CX_n C^\dagger$, $CZ_n C^\dagger$. A symplectic Pauli basis is described as respecting a stabilizer group $\mathcal{S}$ when that basis includes a complete set of generators for $\mathcal{S}$. The encoding Clifford unitaries $C_{in}$ and $C_{out}$ thereby specify the symplectic Pauli bases $\mathcal{B}_{in}$ and $\mathcal{B}_{out}$, which in turn respect $\mathcal{S}_{in}$ and $\mathcal{S}_{out}$.

A symplectic basis $\mathcal{B}$ that respects the code with the stabilizer group $\mathcal{S}$ may be used to determine the complete set of logical operators of $\mathcal{S}$. The symplectic basis $\mathcal{B}$ may be used to define a symplectic basis $[\mathcal{B}]\mathcal{S}$ for the logical operators of $\mathcal{S}$ using a two-step procedure. First, all anti-commuting pairs in which one element of the pair is in $\mathcal{S}$ are removed from the basis. Second, each of the remaining elements is multiplied by $\mathcal{S}$. In the following discussion, the subscript of $[\mathcal{B}]\mathcal{S}$ is omitted when the code is clear from context.

Figure 3B:
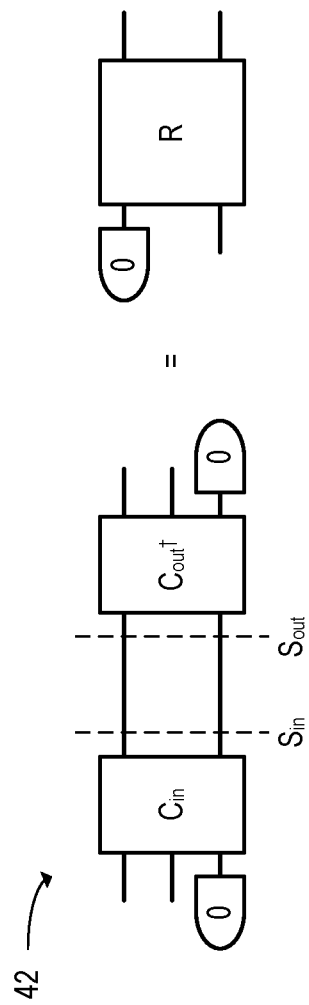
FIG. 3B schematically shows an example code conversion channel, according to the example of FIG. 1.

One simple example of a stabilizer channel 41 is the trivial circuit. Even though the circuit itself is trivial, the trivial circuit may have some nontrivial logical action when viewed as a channel with respect to specified input and output code bases. This nontrivial logical action occurs when the two codes or their bases are different. Such a channel is referred to as a code conversion channel. FIG. 3B schematically shows an example code conversion channel 42. The logical action of the code conversion channel 42 is a simple general-form circuit specified by a $k_{out}$-qubit Clifford unitary R, where $k_{out}$ is the number of logical qubits in $\mathcal{S}_{out}$.

The parameters of a code conversion channel satisfy certain properties. First, as shown in the example of FIG. 3B, the stabilizer group of the output code is included in that of the input code, such that $\mathcal{S}_{out} \subseteq \mathcal{S}_{in}$. Second, the unitary R specifying the logical action maps each independent logical operator of $\mathcal{S}_{out}$ from $\mathcal{S}_{in}/\mathcal{S}_{out}$ to $\overline{Z}_1, \ldots, \overline{Z}_l$ in $[\mathcal{B}_{out}]\mathcal{S}_{out}$, where l is the number of independent generators of $\mathcal{S}_{in}/\mathcal{S}_{out}$. A third condition pertains to the ordered set obtained by removing, from $\mathcal{B}_{in}$, all anti-commuting pairs that include any of the elements of $\mathcal{S}_{in}$, and multiplying the remaining pairs by $\mathcal{S}_{out}$. The unitary R maps the logical operators in the resulting ordered set to $\overline{Z}_{l+1}, \overline{X}_{l+1}, \ldots, \overline{Z}_{k_{out}}, \overline{X}_{k_{out}}$ from $[\mathcal{B}_{out}]\mathcal{S}_{out}$.

As discussed above, the stabilizer circuits considered herein are constructed from operations included in an instruction set $\mathcal{I}$ of specific allowed stabilizer operations. Noise in the execution of the stabilizer circuit is modeled as occurring according to an independent stochastic Pauli noise model, whereby each instruction in $\mathcal{I}$ has an associated set of allowed faults. These allowed faults each occur independently and with some fixed probability. Each fault includes the application of a specific Pauli operator to the physical qubits after the corresponding instruction. The fault may additionally or alternatively include flips of specific measurement outcomes. Specifying a noise model for a stabilizer circuit $\mathcal{C}$ includes specifying the instruction set $\mathcal{I}$ over which $\mathcal{C}$ is expressed, specifying faults for each of the instructions in $\mathcal{I}$, and specifying respective probabilities of each of those faults occurring. To simulate the noisy stabilizer circuit, the original circuit $\mathcal{C}$ may be modified by replacing each instruction in the circuit with the faulty version of that instruction, with the assigned probability.

While most of the following discussion applies to any independent stochastic Pauli noise model, specific constraints on the noise model are provided below where appropriate. Some of the examples provided below refer to two standard noise models, each of which are specified for qubits laid out in a two-dimensional grid. The first of these noise models is phenomenological noise. In the phenomenological noise model, the instruction set $\mathcal{I}$ includes Pauli measurements and unitaries supported on specified sets of qubits, as well as idle steps. The instruction set also includes arbitrary conditional Pauli operators. The circuit is expressed as an alternating sequence of idle rounds and sets of simultaneous commuting Pauli measurements. The faults in the phenomenological noise model include:

1) Three faults for each idle instruction. Each of {X, Y, Z} occurs with probability p/3.
2) An outcome flip of each measurement instruction, which occurs with probability p.

The second of the noise models is circuit noise. In the circuit noise model, the instruction set consists of arbitrary single-qubit stabilizer operations, as well as arbitrary two-qubit stabilizer operations on specified pairs of qubits. The instruction set also includes arbitrary conditional Pauli operators. The faults include:

1) Three faults for each single-qubit instruction. Each of {X, Y, Z} occurs with probability p/3.
2) Fifteen faults for each two-qubit instruction (each of which is a non-trivial two-qubit Pauli). Each of these faults occurs with probability p/15.
3) An outcome flip of each measurement instruction, which occurs with probability p.

Both the phenomenological and circuit noise models provided above assume that conditional Pauli operations never fail, since the conditional Pauli operations may be applied offline with a Pauli-frame update.

There are a number of variants of phenomenological and circuit noise models which can be captured by slight modifications of the parameters in the above models. For example, some noise models are described in terms of exclusive rather than independent events (e.g., when an idle qubit failure occurs, some models indicate that either an X, Y, or Z error occurs). These exclusive phenomenological and circuit noise models may be re-expressed as independent stochastic Pauli noise models of the type discussed above, with specific fault probability values. As another influence on the noise model, the allowed multi-qubit operations are informed by the hardware configuration of the quantum computing device. The set of allowed multi-qubit operations affects what circuits may be implemented.

The following discussion describes stabilizer channels in terms of code deformations. In a code deformation, the code in which information is stored is modified by measuring stabilizer generators for the new code. Many techniques in the field of quantum error correction are naturally described in terms of code deformation. Any stabilizer channel may be expressed as a sequence of code deformation steps, which may make the logical action performed by the stabilizer channel more transparent. Thus, the code deformation viewpoint for stabilizer channels may allow a developer to more easily iterate on the structure of a quantum circuit. The code deformation viewpoint is complementary with other approaches that also help elucidate the functioning of quantum circuits in different ways, such as topological modeling of surface codes.

A code deformation step is discussed below with reference to FIGS. 4A-4C. FIG. 4A schematically shows an example of an elementary code deformation step 50. The elementary code deformation step 50 has an input state stabilized by a Pauli group $\mathcal{S}_{in}$. This input state undergoes a set of commuting Pauli measurements that generate a group $\mathcal{M}$. It is convenient to add a conditional Pauli correction $\hat{P}(m)$ to "fix up" the code deformation step, as shown in the phase-fixed code deformation step 52 of FIG. 4B. The conditional Pauli correction $\hat{P}(m)$ makes the output state independent of the outcome vector m of a set of generators of $\mathcal{M}$. As shown in FIGS. 4A-4B, the elementary code deformation step 50 has an output stabilizer group of $\mathcal{S}_{out} = (\mathcal{S}_{in} \cap \mathcal{M}^\perp) \cdot \mathcal{M}(m)$, whereas the phase-fixed code deformation step 52 has an output stabilizer group of $\mathcal{S}_{out} = (\mathcal{S}_{in} \cap \mathcal{M}^\perp) \cdot \mathcal{M}$ that no longer depends upon m.

The conditional Pauli corrections $\hat{P}(m)$ may be defined in terms of a common symplectic basis $\mathcal{B}(\mathcal{S}_{in}, \mathcal{M})$ that respects both $\mathcal{S}_{in}$ and $\mathcal{M}$. Thus, $\mathcal{B}$ includes complete sets of generators for both $\mathcal{S}_{in}$ and $\mathcal{M}$. FIG. 4C schematically shows the common symplectic Pauli basis $\mathcal{B}$, including 2n Pauli generators separated into five sets. These five sets indicate the membership of those Pauli generators in the sets of generators of $\mathcal{S}_{in}$ and $\mathcal{M}$. The generators shown in FIG. 4C pairwise-commute, except for with vertical neighbors.

As shown in FIG. 4C, the group $\mathcal{M}$ is generated by the elements of $\mathcal{X}^\Delta$, $\mathcal{Z}^\cap$, and $\mathcal{Z}^\blacklozenge$. The conditional Pauli correction $\hat{P}(m)$ is chosen such that for each element of $\mathcal{X}^\Delta$ or $\mathcal{Z}^\blacklozenge$ that has a non-trivial outcome, its anticommuting counterpart from $\mathcal{Z}^\Delta$ or $\mathcal{X}^\blacklozenge$ is applied, respectively.

From the common symplectic basis $\mathcal{B}(\mathcal{S}_{in}, \mathcal{M})$, the subset that includes the generators $\mathcal{Z}^\circ$ and $\mathcal{X}^\circ$ may each be multiplied by the stabilizer group $\mathcal{S}_{out}$ to form a symplectic basis for the logical operators of the code $\mathcal{S}_{out}$, which is denoted as $[\mathcal{B}(\mathcal{S}_{in}, \mathcal{M})]_{\mathcal{S}_{out}}$. Similarly, the generators $\mathcal{Z}^\blacklozenge$, $\mathcal{X}^\blacklozenge$, $\mathcal{Z}^\circ$, and $\mathcal{X}^\circ$ may be used to define a symplectic basis $[\mathcal{B}(\mathcal{S}_{in}, \mathcal{M})]_{\mathcal{S}_{in}}$ for the logical operators of $\mathcal{S}_{in}$.

Figure 5:
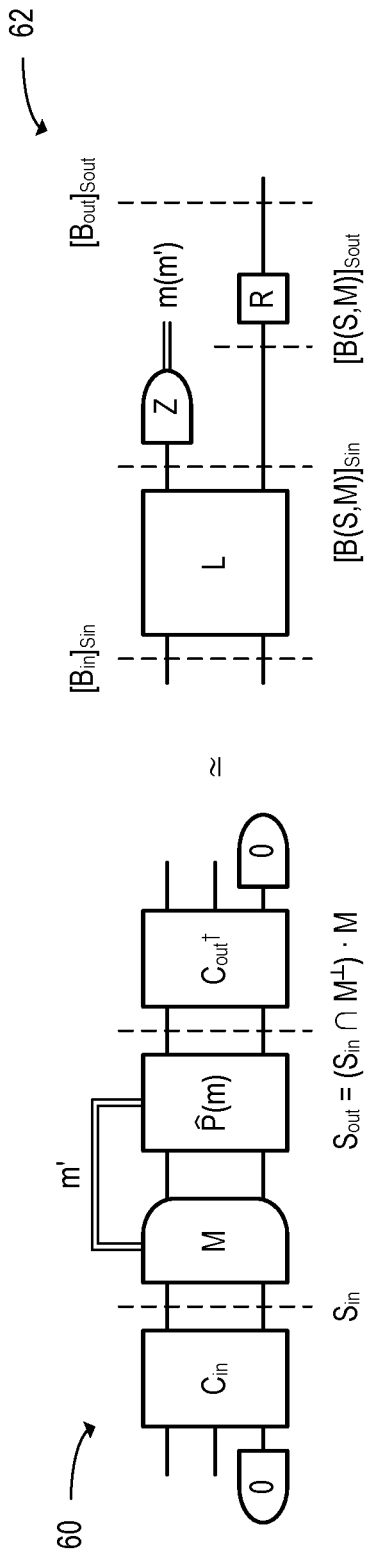
FIG. 5 schematically shows a general-form circuit of a logical action of the phase-fixed code deformation step, according to the example of FIG. 4B.

The logical action of a phase-fixed code deformation step 60 has a simple general-form circuit 62 schematically shown in FIG. 5, according to one example. This general form circuit starts with a logical basis change $L^\dagger$ of the input code $\mathcal{S}_{in}$ from $[\mathcal{B}_{in}]_{\mathcal{S}_{in}}$ to $[\mathcal{B}(\mathcal{S}_{in}, \mathcal{M})]_{\mathcal{S}_{in}}$. Next, single-qubit Z measurements are applied. These single-qubit Z measurements measure all the logical operators of $\mathcal{S}_{in}$ that have representatives in $\mathcal{M}$. Finally, a logical basis change R of the output code $\mathcal{S}_{out}$ is applied from $[\mathcal{B}(\mathcal{S}_{in}, \mathcal{M})]_{\mathcal{S}_{out}}$ to $[\mathcal{B}_{out}]_{\mathcal{S}_{out}}$. Accordingly, as shown in FIG. 5, the $k_{in}$-qubit unitary L maps the logical operators of $\mathcal{Z}_{in}$ from the common symplectic basis to the basis specified by $C_{in}$. The $k_{out}$-qubit unitary R maps the logical operators of $\mathcal{Z}_{out}$ from the common symplectic basis to the basis specified by $C_{out}$.

Figure 6:
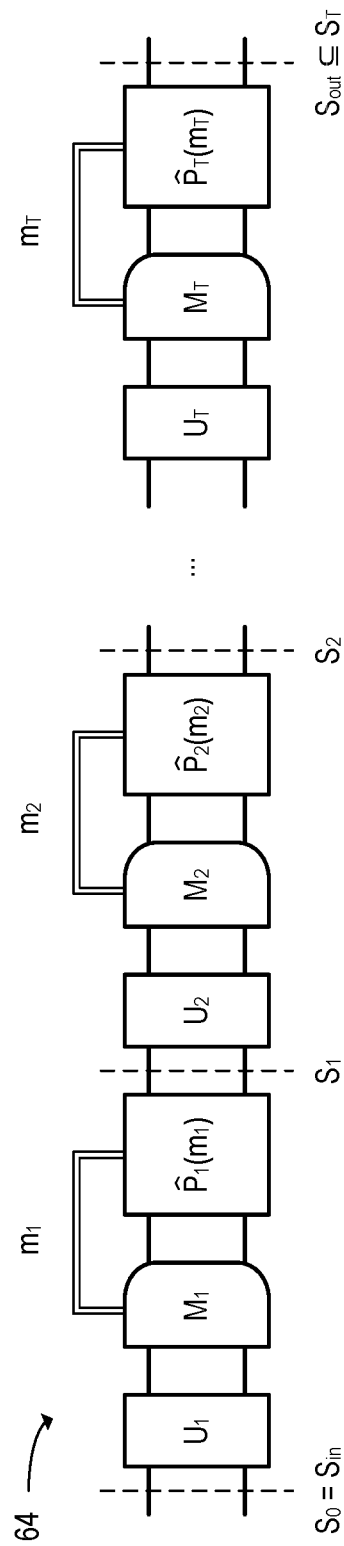
FIG. 6 schematically shows an example code deformation channel, according to the example of FIG. 4B.

FIG. 6 schematically shows an example code deformation channel 64.

The code deformation channel 64 includes a sequence of code deformation steps. Each of T steps included in the code deformation channel 64 includes a Clifford unitary $U_i$ followed by a set of measurements of commuting Pauli operators that generate a group $\mathcal{M}_i$. The measurement outcomes of a generating set for the group $\mathcal{M}_i$ are denoted $m_i$. A conditional phase fix-up $\hat{P}_i(m_i)$ is also included at the end of each step in order to make the stabilizer group after each step independent of the measurement outcomes $m_i$.

The logical action of the code deformation channel 64 may be determined with respect to an input code stabilizer group $\mathcal{S}_{in}$ and an output code stabilizer group $\mathcal{S}_{out}$, with their logical bases fixed by encoding circuits $C_{in}$ and $C_{out}$. The state after the ith phase-fixed code deformation step has a stabilizer group including $\mathcal{S}_i$, where $\mathcal{S}_i = (U_i \mathcal{S}_{i-1} U_i^\dagger) \cap \mathcal{M}_i^\perp$. $\mathcal{M}_i$ for each i=1, ..., T and $\mathcal{S}_0 = \mathcal{S}_{in}$. In addition, $\mathcal{S}_{out} \subseteq \mathcal{S}_T$.

A stabilizer channel $\mathcal{C}$ is described as implementing a T-round code deformation channel $\mathcal{C}_{def}$ when the stabilizer channel $\mathcal{C}$ can be re-collected into a circuit $\tilde{\mathcal{C}}$ that has T rounds, such that the respective rth rounds of $\tilde{\mathcal{C}}$ and $\mathcal{C}_{def}$ are equivalent up to conditional Pauli operators. "Re-collection" refers here to separating the instructions included in the circuit into a new circuit that includes a plurality of rounds of sub-circuits. The re-collection preserves time ordering, such that an instruction B is not assigned to a later round than an instruction A if the timestep at which B is executed is earlier than that of A in the original circuit.

Any stabilizer channel may be expressed as a code deformation channel. The above definition of a code deformation channel naturally describes many known approaches to implementing fault-tolerant quantum error correction (FTQEC) and fault-tolerant logical operations. For example, FTQEC with surface codes, color codes, and many quantum low-density parity-check (LDPC) codes include repeatedly measuring the stabilizer generators of the code. In such a code deformation channel, the unitaries are trivial, $\mathcal{M}$ is the code's stabilizer group, and there are no fix-ups. Similarly, the code deformation channel that describes FTQEC with the Floquet code has no unitaries, but the sets of measured Pauli operators cycle through a sequence (thereby resulting in fix-ups), and the instantaneous stabilizer group of the code $\mathcal{S}_i$ after each step corresponds to a variant of the surface code. Transverse logical Clifford gates are trivially covered by a single step as a single step of a Clifford unitary without any measurements. Logical operations performed with lattice surgery, as well as lattice movements and transformations more generally, may be described as code deformation channels that sequentially evolve code boundaries of a sequence of steps.

Given a stabilizer channel $\mathcal{C}$, there are multiple ways to find a code deformation channel that stabilizer channel implements. For example, the code deformation channel may be determined by progressing sequentially though the stabilizer circuit and collecting the Clifford unitaries and the commuting Pauli measurements into alternating layers. This approach may further include commuting Pauli operators through Clifford unitaries. The round outcomes $m_i(O)$ obtained in this approach are affine functions of the circuit outcome vector O of the stabilizer circuit $\mathcal{C}$.

Figure 7:
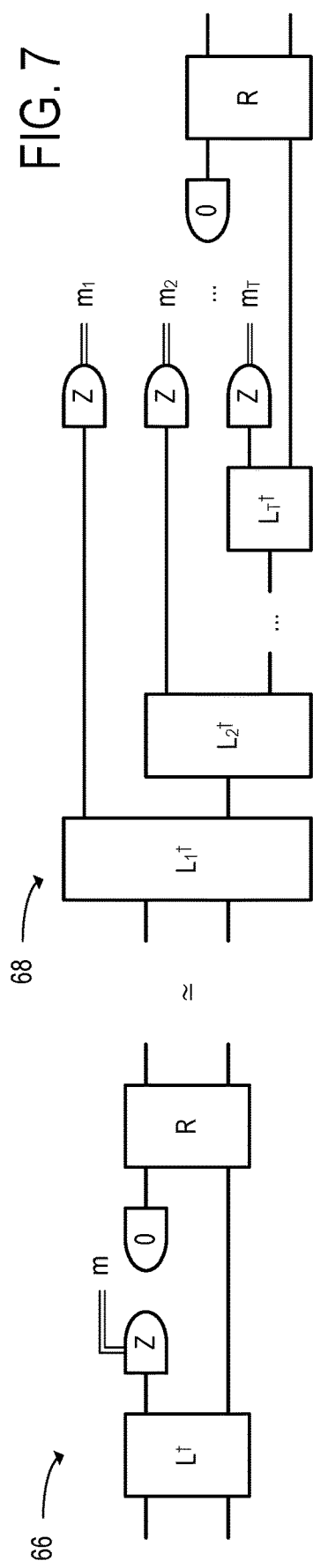
FIG. 7 schematically shows a general-form circuit of a logical action of a code deformation channel, according to the example of FIG. 6.

When a stabilizer channel has been expressed as a code deformation channel, the logical action of the stabilizer channel may be computed. For any code deformation channel, the logical action is equivalent to the general-form circuit 66 shown on the lefthand side of FIG. 7. The simple general-form circuit 66 of FIG. 7 is a restriction of the general-form circuit $\mathcal{C}_{gen}$ shown in FIG. 2, since the general-form circuit 66 has no random bit outcomes or conditional Pauli gates (due to phase fixing in the code deformation channel, as shown in FIG. 6). The logical action 68 of the code deformation channel, shown on the righthand side of FIG. 7, is fully specified by a $k_{in}$-qubit unitary L, an integer k that specifies the number of independent logical Pauli operators measured by the code deformation channel, and a $k_{out}$-qubit unitary R. A logical outcome function $f(O)$ identifies the k-bit logical outcome vector m of the code deformation channel given the channel outcome vector O. The channel outcome vector O in the example of FIG. 7 includes respective channel outcomes $m_1, m_2, \ldots, m_T$ associated with the code deformation steps. As shown in FIG. 7, the Clifford unitary L may be expressed in terms of products of respective logical basis change Clifford unitaries $L_j$ of each non-trivial code deformation step. The Clifford unitary R included in the general-form circuit 66 may be expressed as a code conversion from $\mathcal{S}_T$ to $\mathcal{S}_{out}$, as discussed in further detail below.

As seen from the logical action 68 depicted in FIG. 7, any code deformation channel measures a set of commuting logical Pauli operators of the input code and then re-encodes the remaining logical information in the output code in some basis. The inclusion of the zero-state ancilla in the general-form circuit 66 allows some of the logical degrees of freedom of the output code to be fixed.

The Clifford unitaries L and R may be computed from elementary logical basis change matrices. To define these basis change matrices, a sequence of symplectic Pauli bases $\mathcal{B}_0, \mathcal{B}1, \ldots, \mathcal{B}_T$. For j=1, 2, . . . , T, the corresponding symplectic Pauli basis is defined as $\mathcal{B}_j = \mathcal{B}(U_j \mathcal{S}_{j-1} U_j^\dagger, \mathcal{M}_j)$. Thus, $\mathcal{B}_j$ is a common symplectic basis for $U_j \mathcal{S}_{j-1} U_j^\dagger$, and $\mathcal{M}_j$. In addition, $\mathcal{B}_0 = \mathcal{B}_{in}$ is the Pauli basis specified by the input code encoding Clifford unitary $C_{in}$.

In order to compute the logical action of the fixed-phase code deformation step corresponding to the logical action 68, the input and output symplectic bases are specified for each of the measurement rounds. For round j, an input-output pair including $U_j \mathcal{B}_{j-1} U_j^\dagger$ and $\mathcal{B}$ is selected. With the above choice of input and output symplectic bases, for all j=1, 2, . . . , T, $L_j^\dagger$ is a logical basis change from $$[U_j \mathcal{B}_{j-1} U_j^\dagger]_{U_j \mathcal{S}_{j-1} U_j^\dagger}$$

to $$[\mathcal{B}_j]_{U_j \mathcal{S}_{j-1} U_j^\dagger}.$$

$R_j$ is a logical basis change of the code $\mathcal{S}_j$ from $[\mathcal{B}]$ to $[\mathcal{B}_j]$, and is therefore equal to the identity. The R Clifford unitary in the general-form circuit 66 of FIG. 7 is accordingly identified as a code conversion from $\mathcal{S}_T$ (with an encoding Clifford unitary specified by $\mathcal{B}_j$) to $\mathcal{S}_{out}$ (with an encoding Clifford unitary specified by $C_{out}$. With the above choices of bases, the logical action of $U_j$ is trivial with respect to the input code $\mathcal{S}_{j-1}$ with the logical operator basis $[\mathcal{B}_{j-1}]\mathcal{S}_{j-1}$, and with respect to the output code $U_j \mathcal{S}_{j-1} U_j^\dagger$ with the logical operator basis $$[U_j \mathcal{B}_{j-1} U_j^\dagger]_{U_j \mathcal{S}_{j-1} U_j^\dagger}.$$

The effects of noise on code deformation channels are discussed below. These effects of noise are considered for a stabilizer channel $\mathcal{C}$ from an input code with a stabilizer group $\mathcal{S}_{in}$ to an output code with a stabilizer group $\mathcal{S}_{out}$. The stabilizer channel $\mathcal{C}$ is expressed as a circuit over an instruction set $\mathcal{I}$. The stochastic Pauli noise model is used to model the noise that occurs at the stabilizer channel $\mathcal{C}$. In addition, phase-fixes are assumed to be included in $\mathcal{C}$. The logical action of the stabilizer channel $\mathcal{C}$ is expressed in the Pauli bases $\mathcal{B}_{in}$ and $\mathcal{B}_{out}$ for the input and output codes, respectively. The logical action of the stabilizer channel $\mathcal{C}$ is described by the general-form circuit 66 of FIG. 7, with Clifford unitaries L and R. The outcomes m of logical measurements are encoded in a linear outcome function m=f(O), where O is the channel outcome vector in the absence of noise.

The noise model for the stabilizer circuit $\mathcal{C}$ with the instruction set $\mathcal{I}$ includes an explicit specification of the actions of a set of elementary faults for each instruction. These actions are expressed in terms of outcome bits that are flipped and Pauli errors that are applied to the logical action of the stabilizer channel $\mathcal{C}$, along with the respective probabilities of those errors.

$\mathcal{F}$ or each instruction in $\mathcal{C}$, and for each elementary fault which that instruction can undergo according to the noise model, a respective element is assigned to an elementary fault set $\mathcal{F}$ of the stabilizer channel $\mathcal{C}$. For each element of $\mathcal{F}$, the noise model specifies a respective probability Pr that that elementary fault occurs. The noise model further specifies a corresponding fault effect, which is the effect the fault has on the stabilizer channel $\mathcal{C}$. The fault effect may include a residual error Pauli operator E, which is applied to the qubits at the end of the stabilizer channel $\mathcal{C}$ as a result of the elementary fault. The fault effect may additionally or alternatively include a residual outcome flip bitstring $\delta$, which specifies how the channel outcome vector O is modified to O+$\delta$ as a result of the elementary fault. Undetectable elementary faults are excluded from the elementary fault set $\mathcal{F}$, as discussed in further detail below. When convenient, each elementary fault in $\mathcal{F}$ may be assumed to have a unique effect pair (E, $\delta$).

Multiple elementary faults may occur together, forming a fault F. This fault F is a subset $F \subset \mathcal{F}$. As an assumption of the noise model, elementary faults are sampled independently from $\mathcal{F}$ according to their probabilities, thereby forming the fault $F \subset \mathcal{F}$ with a probability Pr(F). The probability Pr(F) is the probability that those elementary faults included in F occur and that all elementary faults in $\mathcal{F}$/F do not occur. For any fault F, the residual error E(F) is defined as the product of the residual errors of each elementary fault included in F. In addition, the residual outcome flip $\delta$(F) is defined as the sum over the residual outcome flips of each of the elementary faults included in F.

The effect of a Pauli error P acting on the input qubits is defined with $E_{in}(P)$ and $\delta_{in}(P)$. $E_{in}(P)$ and $\delta_{in}(P)$ are, respectively, the residual error at the end of the channel and the residual outcome flip that would occur if P were applied at the start of the stabilizer channel $\mathcal{C}$ without any faults occurring.

A respective weight wt(F) may be associated with each fault. The weights of the faults are defined as wt(F)=log Pr(Ø)−log Pr(F) for each fault $F \subset \mathcal{F}$. Thus, wt($F_1 \sqcup F_2$)=wt($F_1$)+wt($F_2$), where ⊔ indicates a disjoint union. The weights of all elementary faults (and therefore all faults) are assumed to be non-negative. In some of the following examples, which are explicitly indicated, all the weights of the elementary faults are set to a unit weight. For example, if each of the elementary faults occurs with a probability proportional to p, then when assuming unit weights, the probability of a specific fault F occurring is given by $\theta(p^{wt(F)})$. The preceding expression indicates that the probability of the fault F occurring is asymptotically bounded below by $p^{wt(F)}$, such that $$\frac{Pr(F)}{p^{wt(F)}} > C$$

for a constant C when p tends to zero.

A fault F may be represented as a vector $v_F \in \mathbb{F}_2^{|\mathcal{F}|}$, which is referred to as a fault vector. In addition, the notation F+F' is used to refer to the symmetric difference between two faults F and F'. Similarly, an input Pauli error P may be represented as an input error vector $w_{in} \subset \mathbb{F}_2^{2n_{in}}$, which is expressed in the input code basis $\mathcal{B}_{in}$. The fault vector and the input error vector may also be written without the subscripts as v and w.

Error correction at the stabilizer channel $\mathcal{C}$ is discussed below. In the following discussion of error correction, the fault-free channel outcome vector is indicated as O. Given a fault F and an input Pauli error P, the observed channel outcome vector is written as $\tilde{O}=O+\delta(F)+\delta_{in}(P)$. In addition, the output Pauli error at the end of the channel is written as $E(F) \cdot E_{in}(P)$.

The stabilizer channel $\mathcal{C}$ has a plurality of channel checks. Each channel check is either a parity, or the parity plus one, of a subset of elements of the channel outcome vector $\tilde{O}$, with the additional property that the value of the channel check is zero or one for every possible fault-free channel outcome vector O. A set of channel checks is denoted as $\Sigma$. The sum of two channel checks is also a channel check, such that the channel checks form a vector space over $\mathbb{F}_2$. In a noisy channel, each channel check is a linear function of the fault vector $v_F$ and the input error vector $w_{in}$ (more specifically, the portion of $w_{in}$ corresponding to the syndrome of the input code).

The syndrome $\sigma(\tilde{O})$ is defined as the observed outcomes of the checks included in the channel check set $\Sigma$. Any fault-free channel outcome vector O has a trivial syndrome $\sigma(O)=0$, and as such, $\sigma(\tilde{O})=\sigma(\delta(F))+\sigma(\delta_{in}(P))$. The syndrome $\sigma(\tilde{O})$ may be assumed to include all the information used by a decoding algorithm to perform error correction. Thus, $\sigma(\tilde{O})$ acts as an organized and potentially compressed representation of the data included in $\tilde{O}$, which retains information about faults in the channel in a form that is conveniently consumed by the decoding algorithm. Different choices of check bases for the channel check space may be more or less convenient for decoding purposes, despite the syndrome storing equivalent information in those different check bases.

A fault is described as undetectable if that fault has a trivial syndrome, such that $\sigma(\delta(F))=0$ and E(F) has a trivial output syndrome with respect to $\mathcal{S}_{out}$. (Recall that the syndrome $s_{out}(E(F))$ of a Pauli operator E(F) with respect to quantum error correcting code $\mathcal{S}_{out}$ is the bit string $[\![g_1, E(F)]\!], \ldots, [\![g_m, E(F)]\!]$ where $g_1, \ldots, g_m$ are some independent Pauli operators that generate the code $]\!]_{out}$. The commutator $[\![P, Q]\!]$ of two Pauli operators P, Q is zero when P, Q commute and is one otherwise.) The pair $(f(\delta(F)), \bar{E}(F))$ is referred to as the logical action of the undetectable fault F, where $\bar{E}(F)$ is the logical operator of the residual error E(F) with respect to the output code basis $\mathcal{B}_{out}$. If F is undetectable and has non-trivial logical action, F is referred to as a non-trivial fault. As discussed above, elementary faults that are undetectable are excluded from $\mathcal{F}$. These undetectable elementary faults are excluded because an undetectable elementary fault would either be trivial (in which case it can be removed from the elementary fault set $\mathcal{F}$) or non-trivial (in which case the stabilizer channel $\mathcal{C}$ cannot be made tolerant to that fault). One important class of undetectable faults is the class of simple faults. A fault F is referred to as a simple fault when there is no undetectable fault F' that is a proper subset of F.

The linear dependencies of channel checks $\Sigma$ and the output code syndrome $s_{out}(E(F))$ on the fault vectors $v_F$ may be organized as a channel check matrix $A_\Sigma$. The channel check matrix $A_\Sigma$ is defined by the equation $A_\Sigma v_F = \sigma(\delta(F)) \oplus s_{out}(E(F))$. Each undetectable fault F corresponds to an element $v_F$ of the kernel of the channel check matrix $A_\Sigma$.

The linear dependencies of the logical actions of faults on the fault vectors $v_F$ may be organized as a logical effect matrix $A_L$. The logical effect matrix is defined by the equation $A_L v_F = f(\delta(F)) \oplus \bar{E}(F)$, where $\bar{E}(F)$ is a bitstring with respect to the output code basis $\mathcal{B}_{out}$. Each trivial fault F corresponds to a fault vector $v_F$ in the kernels of $A_\Sigma$, and $A_L$, and each non-trivial fault F corresponds to a fault vector $v_F$ in the kernel of $A_\Sigma$ and not in the kernel of $A_L$.

The decoder is assumed herein to be a minimum-weight (MW) decoder $\mathcal{D}$. The minimum-weight decoder $\mathcal{D}$ computes a lowest-weight fault $\hat{F}=\mathcal{D}(\sigma)$ that matches the observed channel syndrome $\sigma=\sigma(\tilde{O})$. This lowest-weight fault $\hat{E}$ is a highest-probability fault with the observed syndrome $\sigma$. Since multiple different sets of faults may have the same observed syndrome in some examples, and since the faults included in those sets may differ from each other by trivial logical faults, the minimum-weight decoder is not guaranteed to identify a fault from the most likely set of faults that have the same logical effect and that match the observed syndrome $\sigma$. From the lowest-weight fault $\hat{F}$, the Pauli correction $\hat{E}=E(\hat{F})$ may be computed and may be applied to the data qubits at the end of the stabilizer channel $\mathcal{C}$. In addition, a corrected channel outcome vector may be computed as $\hat{O}=\tilde{O}+\delta(\hat{F})$. The decoder is assumed to be deterministic, such that the same correction is produced for each of a plurality of instances of a given syndrome $\sigma$. In addition, when the syndrome $\sigma$ is trivial, $\mathcal{D}(\sigma)$ is also assumed to be trivial.

In the presence of noise, error correction is first applied to satisfy each of the channel checks. A channel check is satisfied in the presence of noise and error correction when it has the same value as in the absence of noise. In the absence of noise, a check may be always equal to zero or always equal to one. Subsequently to performing error correction, an algorithm to extract any logical outcomes is applied using the function $f$ on the corrected outcomes $\hat{O}$.

The fault distance (also referred to as the channel distance) of a stabilizer channel $\mathcal{C}$ indicates the number of faults in the stabilizer channel that are correctable.

For a stabilizer channel $\mathcal{C}$ affected by stochastic Pauli noise with an elementary fault set $\mathcal{F}$, the fault distance d $d_\mathcal{C}$ is the minimum weight of a non-trivial fault of $\mathcal{C}$. Accordingly, the fault distance is the minimum weight of an element of the kernel of the channel check matrix $A_\Sigma$ that is not included in the kernel of the logical effect matrix $A_L$. The stabilizer channel $\mathcal{C}$ achieves its fault distance $d\mathcal{C}$ on a simple fault.

The fault distance $d_\mathcal{C}$ of the stabilizer channel $\mathcal{C}$ affects the error correction properties of the stabilizer channel. In the context of operating the quantum computing device 16 of FIG. 1, the stabilizer channel $\mathcal{C}$ is typically included in a larger computation, and later steps in that computation may be used to infer the output code syndrome $\sigma$. Thus, the MW decoder may be assumed to have access to the channel checks and the output syndrome $\sigma$ of the stabilizer channel $\mathcal{C}$. With the access to the output code syndrome, the MW decoder can correct any error with weight less than $d_\mathcal{C}/2$.

The lowest-weight errors that lead to non-trivial faults are discussed below. As discussed above, such an error has weight $d_\mathcal{C}/2$. To further describe the lowest-weight errors that lead to non-trivial faults, odd and even simple faults are defined as follows. A simple fault is even when that simple fault may be represented as a disjoint union of faults $F_1 \sqcup F_2$ such that $wt(F_1)=wt(F_2)=wt(F)/2$. Each fault that is not an even fault is an odd fault. In an example in which the channel fault distance is achieved on an even fault $F_1 \sqcup F_2$, with $wt(F_1)=wt(F_2)=d_C/2$, then at least one of $s_{out}(F_1)$ and $\sigma(F_2)$ is nonzero, because $F_1 \sqcup F_2$ is a simple fault. Since $F_1 \sqcup F_2$ is a non-trivial fault, the logical actions of $F_1$ and $F_2$ are different. For the syndrome $\sigma(F_1)=\sigma(F_2)$ and the output code syndrome $s_{out}(F_1)=s_{out}(F_2)$, the deterministic MW decoder computes a minimum-weight fault F'. The logical action of F' differs from that of either $F_1$ or $F_2$, so either $F_1$ or $F_2$ followed by the correction for F' corresponds to a logical error. When the fault distance is achieved on an even fault, $d_C/2$ is a tight (non-inclusive) upper bound on the weight of correctable errors.

In the following example, the channel distance is achieved on odd faults without being achieved on any even faults. In this example, F is a channel-distance-achieving odd fault, and $F_e \subset F$ is a positive-weight elementary fault. Then $F=F_1 \sqcup F_2 \sqcup F_e$ is a disjoint union of three sets of faults. It is assumed without loss of generality that $wt(F_1) \geq wt(F_2)$. The fault $F_1 \sqcup F_e$ is therefore a fault that results in error correction failure. In examples in which $F_1 \sqcup F_e$ occurs at the stabilizer channel $C$, then $F_2$ and $F_1 \sqcup F_e$ have the same channel syndrome and output code syndrome, at least one of which is nonzero. The MW decoder computes a correction F' that has a weight of at most $wt(F_2) \leq (d_C - wt(F_e))/2$ and the same syndromes and same logical action as $F_2$. Correcting for F' causes a logical error that is equal to the logical action of F. Thus, in examples in which the channel distance is achieved on odd faults without being achieved on any even faults, there exists a non-correctable fault with weight $wt(F_1 \sqcup F_e) \in (d_C/2, d_C]$. In examples in which each of the elementary faults have the same weight $w_0$, the faults $F_1$ and $F_2$ may be selected such that $wt(F_1)=wt(F_2)$. Thus, in such examples, the non-correctable fault has a weight of ($d_C+w_0)/2$.

Hook faults (also referred to as hook errors) are discussed below. A hook fault is a fault that, due to the implementation details of a circuit, spreads into a large-weight error, thereby resulting in an increased corrupting effect on the encoded information. The concept of a hook error is formalized below for general stabilizer channels. This formalization includes a comparison of the effects of two different noise models that are defined for different instruction sets. Specifically, faults that occur in circuit noise, as defined for a circuit expressed in a low-level instruction set of one- and two-qubit gates, are distinguished from faults that occur in phenomenological noise, which are defined for a representation of a stabilizer circuit expressed in a higher-level instruction set as a code deformation channel.

As discussed above, a stabilizer channel $C$ is described as implementing a code deformation channel $C_{def}$ when the stabilizer channel $C$ can be re-collected into a sequence of measurement rounds equivalent to the rounds of $C_{def}$. In addition, as discussed above, two stabilizer circuits are equivalent if those stabilizer circuits have the same action when the outcome vectors of the circuits satisfy an affine relation. In the following discussion of hook errors, a stronger notion of equivalence is used, according to which each outcome of each code deformation round depends only upon a disjoint subset of the outcomes of the re-collected circuit round. The stabilizer channel $C$ may be split into sub-circuits that are each equivalent to code deformation rounds. The outcomes of the subcircuits can each be mapped to a corresponding code deformation round, such that the code deformation rounds can be re-collected into the stabilizer channel $C$. When the above equivalence relation holds for each measurement round, the stabilizer channel $C$ is described as tightly implementing the code deformation channel $C_{def}$.

For a stabilizer channel $C$, the elementary fault set for circuit noise is denoted as $\mathcal{F}$, and the elementary fault set of phenomenological noise on the code deformation channel $C_{def}$ is denoted as $\mathcal{F}_{def}$. In both the circuit noise model and the phenomenological noise model, the elementary faults are assumed to have unit weights. For the purposes of the phenomenological noise model, the idle locations in the code deformation channel $C_{def}$ are placed at the ends of each of the code deformation rounds. The tight implementation of $C_{def}$ by $C$ implies that an outcome vector $O_{def}$ of $C_{def}$ can be obtained from the outcome vector O of $C$ by a relation $O_{def}=MO+o$, where M has rows with disjoint support. The effect of each elementary fault in $\mathcal{F}$ can thereby be mapped to an effect on $C_{def}$ using the equation for $O_{def}$.

The set of all possible fault effects of a given elementary fault set forms a linear space. By the properties of the circuit and phenomenological noise models, and since $C$ tightly implements $C_{def}$, the fault sets have the following properties:

1) The set of effects of the elementary faults from $\mathcal{F}_{def}$ on $C_{def}$ is a subset of the effects of the elementary faults from $\mathcal{F}$ on $C_{def}$.

2) The effects of the elementary faults from $\mathcal{F}_{def}$ on $C_{def}$ and the effects of the faults from $\mathcal{F}$ on $C_{def}$ generate the same linear space.

An elementary fault $F \in \mathcal{F}$ is referred to as a channel hook fault for $C_{def}$ when no element of $\mathcal{F}_{def}$ matches the effect of F on $C_{def}$. In addition, a channel hook fault $F \in \mathcal{F}$ is referred to as a severe hook fault when F is included in a minimal-weight non-trivial logical fault for $C_{def}$ with respect to $\mathcal{F}$. "With respect to $\mathcal{F}$," as used in the above definition, means that the code deformation channel $C_{def}$ is affected by stochastic Pauli noise with the fault set $\mathcal{F}$. A channel hook fault $\mathcal{F} \in \mathcal{F}$ for $C_{def}$ is referred to as a conspicuous severe hook fault when F is included in a minimum-weight non-trivial logical fault for $C_{def}$ with respect to $\mathcal{F}_{def}$.

Three fault distances are defined as follows:

d is the circuit fault distance of $C_{def}$. The circuit fault distance d is the fault distance of the channel $C_{def}$ with respect to the elementary fault set $\mathcal{F}$.

$d_{def}$ is the phenomenological fault distance of $C_{def}$. The phenomenological fault distance $d_{def}$ is the fault distance of the code deformation channel $C_{def}$ with respect to the elementary fault set $\mathcal{F}_{def}$.

$d_C$ is the fault distance of $C$ with respect to the elementary fault set $\mathcal{F}$, as discussed above.

Three bounds on these fault distances may be computed as follows. First, the phenomenological fault distance $d_{def}$ is upper bounded by the smallest code distance in the code deformation sequence $S_1, \ldots, S_T$ of the code deformation channel $C_{def}$. The phenomenological fault distance $d_{def}$ has this upper bound because the phenomenological elementary fault set $\mathcal{F}_{def}$ includes a full set of single-qubit Pauli operators at the end of each measurement round. Thus, a minimum-weight non-trivial logical operator may be constructed for any of the instantaneous stabilizer group within $\mathcal{F}_{def}$ using a number of elements of $\mathcal{F}_{def}$ equal to the weight of the logical operator. That minimum-weight non-trivial logical operator corresponds to a non-trivial logical fault for the channel.

As a second bound, $d \leq d_{def}$. The circuit fault distance d has this bound because the linear spaces generated by the effects of the two elementary fault sets on $\mathcal{C}_{def}$ are the same. Thus, the non-trivial logical faults produced from both fault sets are identical, but since the effects of $\mathcal{F}_{def}$ are a subset of the effects of $\mathcal{F}$, each fault has at most the same weight with respect to $\mathcal{F}$ as with respect to $\mathcal{F}_{def}$. This second bound requires that the stabilizer circuit $\mathcal{C}$ tightly implements the code deformation circuit $\mathcal{C}_{def}$. In examples in which $\mathcal{F}$ includes no severe hook faults, the circuit distance d is equal to the phenomenological distance $d_{def}$.

As a third bound, $d_{\mathcal{C}} \geq d$. Considering the effects of faults in the circuit noise elementary fault set $\mathcal{F}$ on $\mathcal{C}_{def}$ rather than on $\mathcal{C}$, there may be some loss of information that could be used to detect faults. A non-trivial fault $F \subset \mathcal{F}$ that is undetectable on $\mathcal{C}_{def}$ could potentially be detectable on $\mathcal{C}$ due to this additional information, which would increase the fault distance $d_{\mathcal{C}}$ above d.

The fault distances of combinations of stabilizer channels are discussed below. In the following discussion, conditions are specified under which a sequence of stabilizer channels has a given fault distance d. As discussed in further detail below, when a stabilizer channel and its fault set satisfy a time locality property, simple faults at that stabilizer channel are contiguous in time. This contiguousness property allows a fault in a composed stabilizer channel to be localized to a pair of consecutive stabilizer channels included in the composed stabilizer channel.

For a stabilizer channel with a fault set $\mathcal{F}$, the fault set $\mathcal{F}$ may be partitioned into disjoint subsets as $\mathcal{F} = \mathcal{F}_1 \sqcup \mathcal{F}_2 \sqcup \ldots \sqcup \mathcal{F}_T$. The indices of the disjoint subsets refer to partition timesteps, which are timesteps of stabilizer channel execution that correspond to the disjoint subsets. A stabilizer channel with a channel check set $\Sigma$ is time-local with respect to the above fault set partition when the channel check set $\Sigma$ has a partition $\Sigma = \Sigma_1 \sqcup \Sigma_2 \sqcup \ldots \sqcup \Sigma_T$ that satisfies the following time locality criteria:

1) The checks included in the first channel check set $\Sigma_1$ depend only on an input code syndrome $s_{in}$ of an input error $E_{in}$ and the elementary faults included in $\mathcal{F}_1$. The input code syndrome $s_{in}$ of a Pauli operator E(F) with respect to quantum error correcting code $\mathcal{S}_{in}$ is the bit string $[\![g_1, E(F)]\!], \ldots, [\![g_m, E(F)]\!]$ where $g_1, \ldots, g_m$ are independent Pauli operators that generate the code $\mathcal{S}_{in}$.
2) The input code syndrome $s_{in}$ may be computed from checks included in $\Sigma_1$ when no faults occur. Specifically, the input code syndrome $s_{in}$ is an affine function of the checks. Thus, the input code syndrome $s_{in}$ is isomorphic to the first channel check set $\Sigma_1$ when no faults occur at the stabilizer channel.
3) Checks included in the channel check set $\Sigma_j$ depend only on the elementary faults in $\mathcal{F}_{j-1} \sqcup \mathcal{F}_j$ for $j \in [2, T]$.
4) The output code syndrome $s_{out}$ depends only on the checks in $\Sigma$ and the elementary faults in $\mathcal{F}_T$.

In a time-local stabilizer channel, simple faults are contiguous in time. For a simple fault configuration F that is a subset of $\mathcal{F}_{j_1} \sqcup \ldots \sqcup \mathcal{F}_{j_m}$, for $j_1 < j_2 < \ldots < j_m$, where $F \cap \mathcal{F}_{j_k}$ is non-empty for all $k \in [m]$, the indices of the disjoint union have the property that $j_k = j_{k-1} + 1$ for each $k \in [2, m]$, thereby indicating that the fault configuration F is contiguous in time.

The composition of two time-local stabilizer channels is also a time-local stabilizer channel. In the following example, two stabilizer channels $\mathcal{C}^\alpha$ and $\mathcal{C}^\beta$ are time-local with respect to partitions of the fault sets $\mathcal{F}^\alpha = \{\mathcal{F}_j^\alpha\}_{j \in [T^\alpha]}$ and $\mathcal{F}^\beta = \{\mathcal{F}_j^\beta\}_{j \in [T^\beta]}$, respectively. In addition, the stabilizer channels $\mathcal{C}^\alpha$ and $\mathcal{C}^\beta$ have respective sets of check bases and $$\Sigma^\alpha = \{\Sigma_j^\alpha\}_{j \in [T^\alpha]}.$$

and $$\Sigma^\beta = \{\Sigma_j^\beta\}_{j \in [T^\beta]}.$$

In addition, $\mathcal{S}_{in}^\beta = \mathcal{S}_{out}^\alpha$, and these stabilizer groups are considered with respect to the same symplectic Pauli basis. Under the above conditions, the stabilizer channel composition $\mathcal{C}^\alpha \circ \mathcal{C}^\beta$ is time-local with respect to the partition $\{\mathcal{F}_j^\alpha\}_{j \in [T^\alpha]} \sqcup \{\mathcal{F}_j^\beta\}_{j \in [T^\beta]}$ of the fault set $\mathcal{F}^\alpha \sqcup \mathcal{F}^\beta$.

To demonstrate that $\mathcal{C}^\alpha \circ \mathcal{C}^\beta$ is time-local, the time locality criteria discussed above are demonstrated below for $\mathcal{C}^\alpha \circ \mathcal{C}^\beta$. First, the checks included in $$\Sigma_1^\beta$$

depend on the input code syndrome $s_{in}^\beta$ of the input error $E_{in}^\beta$ and on the elementary faults included in $\mathcal{F}_1^\beta$. In addition, $s_{in}^\beta = s_{out}^\alpha$ and is a function of the faults in $\mathcal{F}_{T^\alpha}^\alpha$ and checks in $\Sigma^\alpha$. Thus, $s_{out}^\beta$ may be expressed as a function of checks included in $\Sigma^\alpha \sqcup \Sigma^\beta$ and faults in $\mathcal{F}_{T^\beta}^\beta$. The check set $\Sigma_1^\beta$ may be modified to construct a check set $$\tilde{\Sigma}_1^\beta$$

that depends upon $\mathcal{F}_{T^\alpha}^\alpha \sqcup \mathcal{F}_1^\beta$ by combining $$\Sigma_1^\beta$$

with the checks in $\Sigma^\alpha$. The check basis partition $$\{\Sigma_j^\alpha\}_{j \in [T^\alpha]} \sqcup \{\tilde{\Sigma}_1^\beta\} \sqcup \{\Sigma_j^\beta\}_{j \in [2, T^\beta]}$$

satisfies the time locality criteria for the check set.

In examples in which T=1, the time locality criteria are considerably simplified. In such examples, when the stabilizer channel satisfies the condition that the input syndrome $s_{in}$ is a function of the checks in $\Sigma$ when no faults occur, the output syndrome $s_{out}$ may be expressed as a linear function of the fault vector $v_F$ and the checks.

In the following example, the elementary faults included in the fault sets of the stabilizer channels are assumed to have uniform weights. In this example, a simple fault of weight d in a time-local stabilizer channel can span at most d consecutive elements of the partition $\mathcal{F}_{j+1} \sqcup \ldots \sqcup \mathcal{F}_{j+d}$ for some j. Otherwise, the weight of the simple fault would be greater than d. As discussed below, the above property is used to establish the conditions under which stabilizer channel composition is distance-preserving.

The channel distance of a sequence of three stabilizer channels $\mathcal{C}^\alpha$, $\mathcal{C}^\beta$, and $\mathcal{C}^\gamma$ may be computed from the channel distances of its component pairs of stabilizer channels under some conditions. As a first condition, the stabilizer channels $\mathcal{C}^\alpha$, $\mathcal{C}^\beta$, and $\mathcal{C}^\gamma$ are compatible, time-local stabilizer channels with unit-weight faults. In addition, the compositions $\mathcal{C}^\alpha \circ \mathcal{C}^\beta$ and $\mathcal{C}^\beta \circ \mathcal{C}^\gamma$ are stabilizer channels with distances of at least d, and the fault set partition with respect to which $\mathcal{C}^\beta$ is time-local has a size of at least d. Under such conditions, the composition $\mathcal{C}^\alpha \circ \mathcal{C}^\beta \circ \mathcal{C}^\gamma$ also has a distance of at least d. Thus, the above conditions allow for computation of a lower-bound channel distance of a sequence of three or more stabilizer channels.

A sequence of stabilizer channels may, in some examples, satisfy the following conditions under which the sequence of stabilizer channels is known to satisfy the above conditions and to therefore have a channel distance of at least d. In some such examples, the stabilizer channels each have the same number of input and output logical qubits and each act one or two logical qubits encoded in the same code. The time-local stabilizer channels in such a sequence may be divided into two finite sets of time-local stabilizer channels, $\mathfrak{C}^{short}$ and $\mathfrak{C}^{long}$. Each stabilizer channel included in $\mathfrak{C}^{long}$ is time-local with a fault-set partition of at least size d, and acts on one logical qubit. As an additional criterion, for any pair of one-qubit stabilizer channels $\mathcal{C}^\alpha \in \mathfrak{C}^{short}$ and $\mathcal{C}^\beta \in \mathfrak{C}^{long}$, the compositions $\mathcal{C}^\alpha \circ \mathcal{C}^\beta$ and $\mathcal{C}^\beta \circ \mathcal{C}^\alpha$ both have distance d. As a further criterion, for any two-qubit stabilizer channel $\mathcal{C}^\alpha \in \mathfrak{C}^{short}$ and one-qubit stabilizer channels $\mathcal{C}^\beta$, $\mathcal{C}^\gamma \in \mathfrak{C}^{long}$, the compositions $\mathcal{C}^\alpha \circ (\mathcal{C}^\beta \otimes \mathcal{C}^\gamma)$ and $(\mathcal{C}^\beta \otimes \mathcal{C}^\gamma) \circ \mathcal{C}^\alpha$ both have distance d.

Figure 8:
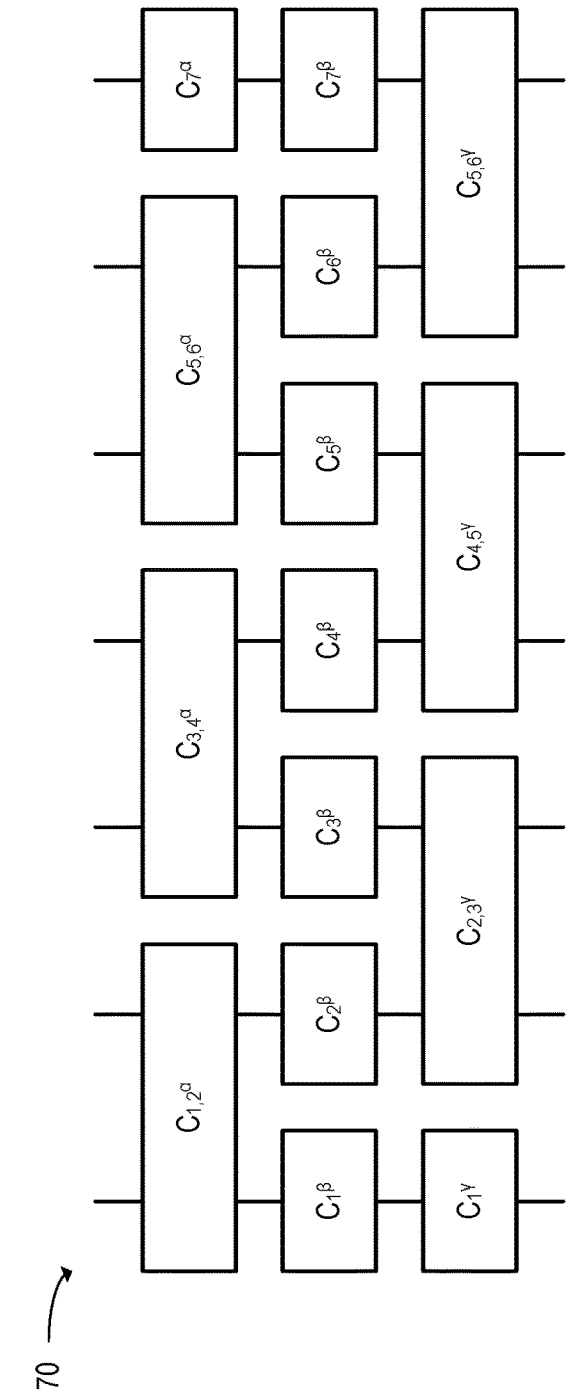
FIG. 8 schematically shows an example interleaved stabilizer channel composition, according to the example of FIG. 1.

The conditions under which the composition $\mathcal{C}^\alpha \circ \mathcal{C}^\beta \circ \mathcal{C}^\gamma$ has a distance of at least d, as discussed above, imply that a composition that interleaves short and long stabilizer channels is a stabilizer channel of distance at least d. An example of such an interleaved stabilizer channel composition 70 is schematically depicted in FIG. 8. In the example interleaved stabilizer channel composition 70, the elementary stabilizer channels $\mathcal{C}_j^\alpha, \mathcal{C}_{j,j+1}^\alpha, \mathcal{C}_j^\gamma, \mathcal{C}_{j,j+1}^\gamma$ are time-local, and the elementary stabilizer channels $\mathcal{C}_j^\beta$ are time-local with fault-set partition sizes of at least d. In addition, the stabilizer channel compositions $\mathcal{C}_j^\beta \circ \mathcal{C}_j^\gamma$, $\mathcal{C}_j^\alpha \circ \mathcal{C}_j^\beta$, $\mathcal{C}_{j,j+1}^\alpha \circ (\mathcal{C}_j^\beta \otimes \mathcal{C}_{j+1}^\beta)$, and $(\mathcal{C}_j^\beta \otimes \mathcal{C}_{j+1}^\beta) \circ \mathcal{C}_{j,j+1}^\gamma$ are of distance d. Accordingly, the overall stabilizer channel $\mathcal{C}^\alpha \circ \mathcal{C}^\beta \circ \mathcal{C}^\gamma$ is of distance d, since $\mathcal{C}^\alpha \circ \mathcal{C}^\beta$ and $\mathcal{C}^\beta \circ \mathcal{C}^\gamma$ satisfy the stabilizer channel composition distance conditions.

Although the above stabilizer channel composition examples are discussed with reference to compositions of three stabilizer channels, the above properties of stabilizer channel composition also apply to compositions of more than three stabilizer channels. In addition, compositions of stabilizer channels with different numbers of input and output qubits, and/or with different codes for the logical qubits, may also be composed as discussed above. In such examples, the composed stabilizer channels retain the channel distance properties discussed above.

Figure 9:
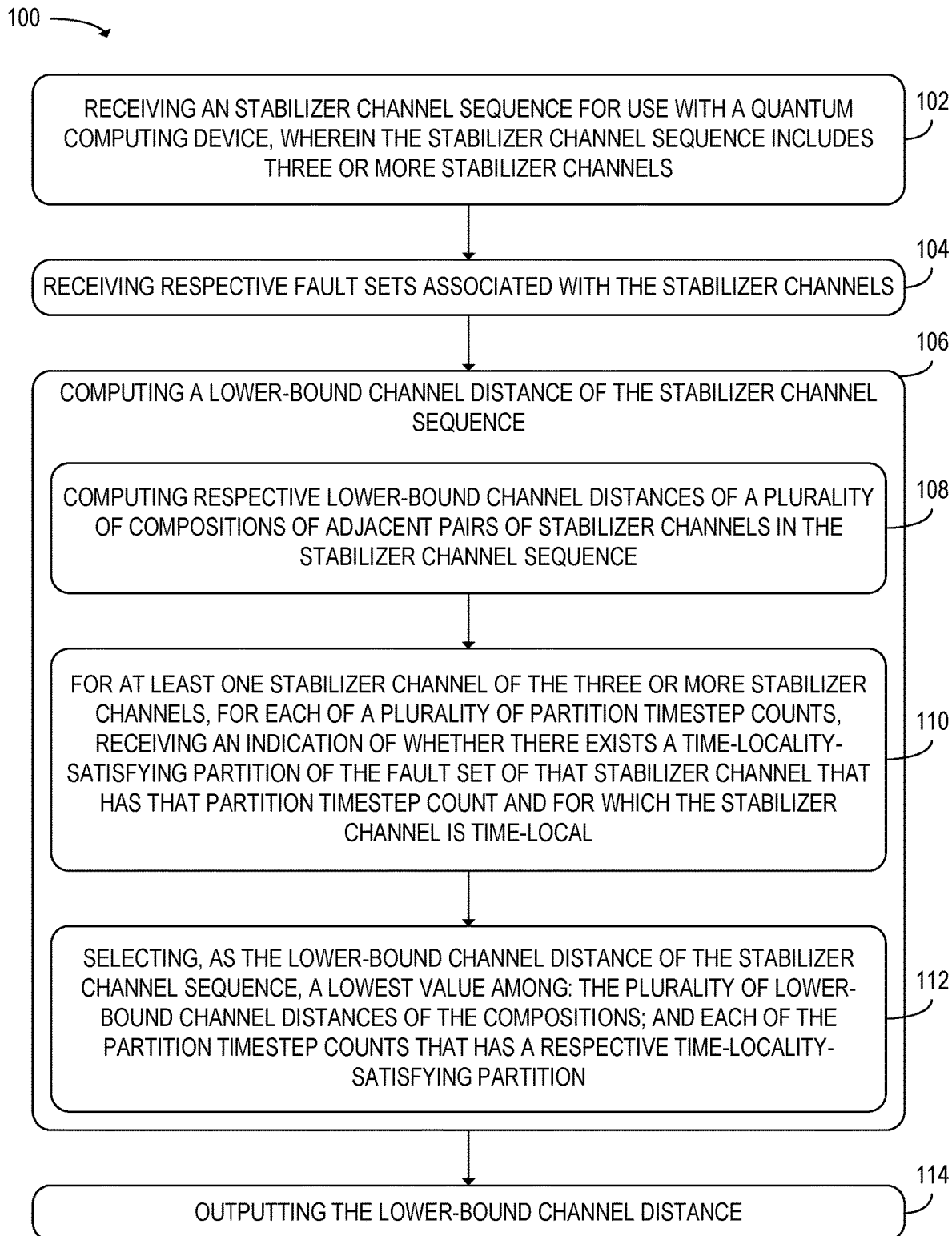
FIG. 9 shows a flowchart of a method for use with a computing system to determine a lower-bound channel distance of a stabilizer channel, according to the example of FIG. 1.

FIG. 9 shows a flowchart of a method 100 for use with a computing system to determine the lower-bound channel distance d of a stabilizer channel. For example, the method 100 may be performed at the processor 20 of the classical computing device 18. At step 102, the method 100 includes receiving a stabilizer channel sequence for use with a quantum computing device. The stabilizer channel sequence includes three or more stabilizer channels that are composed in a specified order.

At step 104, the method 100 further includes receiving respective fault sets associated with the stabilizer channels. The fault sets may each include a respective plurality of elementary faults. In addition, each of the fault sets may further include a plurality of compositions of the elementary faults. According to some examples, the plurality of elementary faults include a plurality of phenomenological noise elementary faults and a plurality of circuit noise elementary faults. In other examples, some other independent stochastic Pauli noise model may be used to specify the fault sets of the stabilizer channels.

In examples in which the set of elementary faults includes phenomenological noise elementary faults, the plurality of phenomenological noise elementary faults may include a first plurality of one-qubit Pauli errors respectively associated with idle instructions. The one-qubit Pauli errors may be X, Y, and Z errors that each occur with probability p/3. The plurality of phenomenological noise elementary faults may further include a first plurality of outcome flips respectively associated with measurement instructions. The outcome flips may each occur with probability p.

In examples in which the set of elementary faults includes circuit noise elementary faults, the plurality of circuit noise elementary faults may include a second plurality of one-qubit Pauli errors respectively associated with single-qubit stabilizer instructions. The one-qubit Pauli errors may be X, Y, and Z errors that each occur with probability p/3. The plurality of circuit noise elementary faults may further include a plurality of two-qubit Pauli errors respectively associated with two-qubit stabilizer instructions. The two-qubit Pauli errors may each occur with probability p/15. In addition, the plurality of circuit noise elementary faults may further include a second plurality of outcome flips respectively associated with measurement instructions. The outcome flips may each occur with probability p.

At step 106, the method 100 further includes computing a lower-bound channel distance of the stabilizer channel sequence. The channel distance of a stabilizer channel is the number of faults in the stabilizer channel that are correctable. Thus, the lower-bound channel distance is a lower bound on the number of correctable faults that may occur at the stabilizer channel sequence.

Step 106 includes, at step 108, computing respective lower-bound channel distances of a plurality of compositions of adjacent pairs of stabilizer channels in the stabilizer channel sequence. In some examples, the lower-bound channel distances of the compositions of adjacent pairs are computed using a graph-based algorithm. Using such an algorithm, computing the lower-bound channel distances of the compositions may include computing a shortest graph-like undetectable non-trivial error of the composition. The lower-bound channel distance of the composition, in such examples, is given by the length of the shortest graph-like undetectable non-trivial error. The identification of graph-like undetectable non-trivial errors is discussed in further detail below.

At step 110, for at least one stabilizer channel of the three or more stabilizer channels, and for each of a plurality of partition timestep counts, step 106 may further include receiving an indication of whether there exists a time-locality-satisfying partition of the fault set of that stabilizer channel. The time-locality satisfying partition is a partition of the fault set that has the specified partition timestep count, and for which the stabilizer channel is time-local.

The time-locality-satisfying partition may be a partition of the fault set that fulfills a plurality of time locality criteria. These time locality criteria may include a criterion that a first channel check set associated with a first partition timestep of a plurality of partition timesteps encodes a function of an input code syndrome, and of each of the elementary faults included in a first disjoint subset of the fault set. The time locality criteria may further include a criterion that when no faults occur at the stabilizer channel, the input code syndrome is isomorphic to the first channel check set.

Additionally or alternatively, the plurality of time locality criteria may include a criterion pertaining to a plurality of additional channel check sets associated with subsequent partition timesteps of the plurality of partition timesteps. That time locality criterion may specify that those additional channel check sets each encode respective functions of the elementary faults included in corresponding disjoint unions of a previous-timestep disjoint subset and a current-timestep disjoint subset. The previous-timestep disjoint subset is associated with a previous partition timestep of the plurality of partition timesteps, and the current-timestep disjoint subset is associated with a current partition timestep of the plurality of timesteps.

In some examples, the plurality of time locality criteria may further include a criterion that an output code syndrome is a function of the plurality of channel check sets and of each of the elementary faults included in a final disjoint subset. The final disjoint subset is associated with a final partition timestep of the plurality of partition timesteps.

At step 112, step 106 further includes selecting, as the lower-bound channel distance of the stabilizer channel sequence, a lowest value in a set that includes the plurality of lower-bound channel distances of the compositions, and that further includes each of the partition timestep counts that has a respective time-locality-satisfying partition. At step 114, the method 100 further includes outputting the lower-bound channel distance. Thus, the computing system identifies a lower bound on the number of correctable errors that may occur at the stabilizer channel.

Figure 10A:
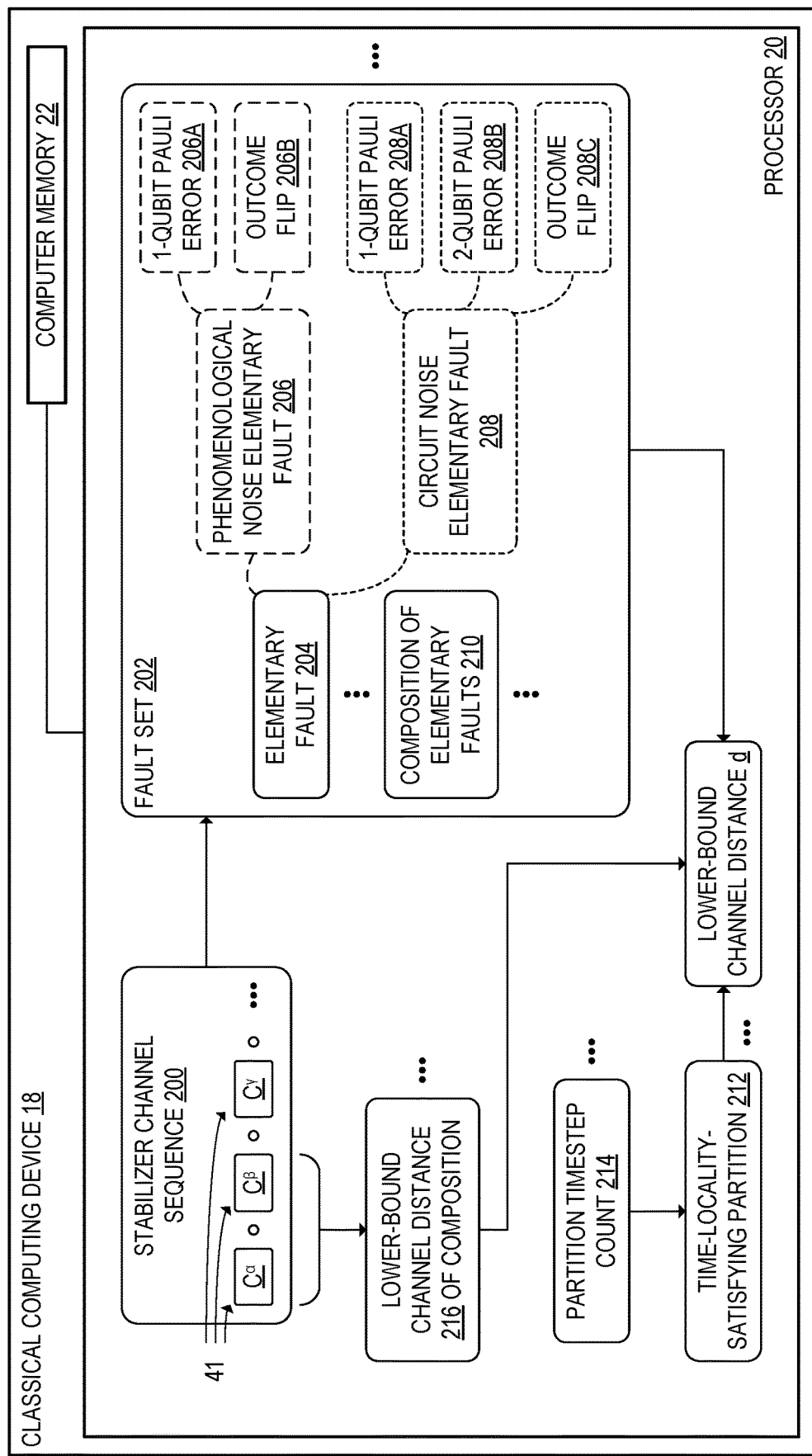
FIG. 10A schematically shows the classical computing device when one or more processing devices are configured to compute and output a lower-bound channel distance of a stabilizer channel sequence, according to the example of FIG. 1.

FIG. 10A schematically shows the classical computing device 18 included in the computing system 10 when the one or more processing devices included in the processor 20 are configured to compute and output the lower-bound channel distance d, according to one example. As shown in FIG. 10A, the processor 20 is configured to receive a stabilizer channel sequence 200 for use with a quantum computing device 16. The stabilizer channel sequence 200 includes three or more stabilizer channels 41, which are labeled in the example of FIG. 10A as $\mathcal{C}^\alpha$, $\mathcal{C}^\beta$, and $\mathcal{C}^\gamma$.

The processor 20 is further configured to receive respective fault sets 202 associated with the stabilizer channels 41. As shown in the example of FIG. 10A, the fault sets 202 each include a respective plurality of elementary faults 204, as well as a plurality of compositions of the elementary faults 210 associated with that stabilizer channel 41. In some examples, the plurality of elementary faults 204 may include a plurality of phenomenological noise elementary faults 206 and a plurality of circuit noise elementary faults 208. Other independent stochastic Pauli noise models may additionally or alternatively be used to represent noise occurring at the stabilizer channels.

The plurality of phenomenological noise elementary faults 206 may include a first plurality of one-qubit Pauli errors 206A respectively associated with idle instructions. In addition, the phenomenological noise elementary faults 206 may further include a first plurality of outcome flips 206B respectively associated with measurement instructions.

The plurality of circuit noise elementary faults 208 may include a second plurality of one-qubit Pauli errors 208A respectively associated with single-qubit stabilizer instructions. The plurality of circuit noise elementary faults 208 may further include a plurality of two-qubit Pauli errors 208B respectively associated with two-qubit stabilizer instructions. In addition, the plurality of circuit noise elementary faults 208 may further include a second plurality of outcome flips 208C respectively associated with measurement instructions.

The processor 20 is further configured to compute a lower-bound channel distance d of the stabilizer channel sequence 200. When computing the lower-bound channel distance d, the processor 20 is configured to compute respective lower-bound channel distances 216 of a plurality of compositions of adjacent pairs of stabilizer channels 41 that are included in the stabilizer channel sequence 200. For example, FIG. 10A shows the classical computing device 18 when the processor 20 computes the lower-bound channel distance 216 for the composition $\mathcal{C}^\alpha \circ \mathcal{C}^\beta$.

The processor 20 is further configured to receive time locality data for at least one stabilizer channel 41 of the three or more stabilizer channels 41, and for each of a plurality of partition timestep counts 214. For the at least one stabilizer channel 41, for each of the partition timestep counts 214, the processor 20 is further configured to receive an indication of whether there exists a time-locality-satisfying partition 212 of the fault set 202 of that stabilizer channel 41.

Figure 10B:
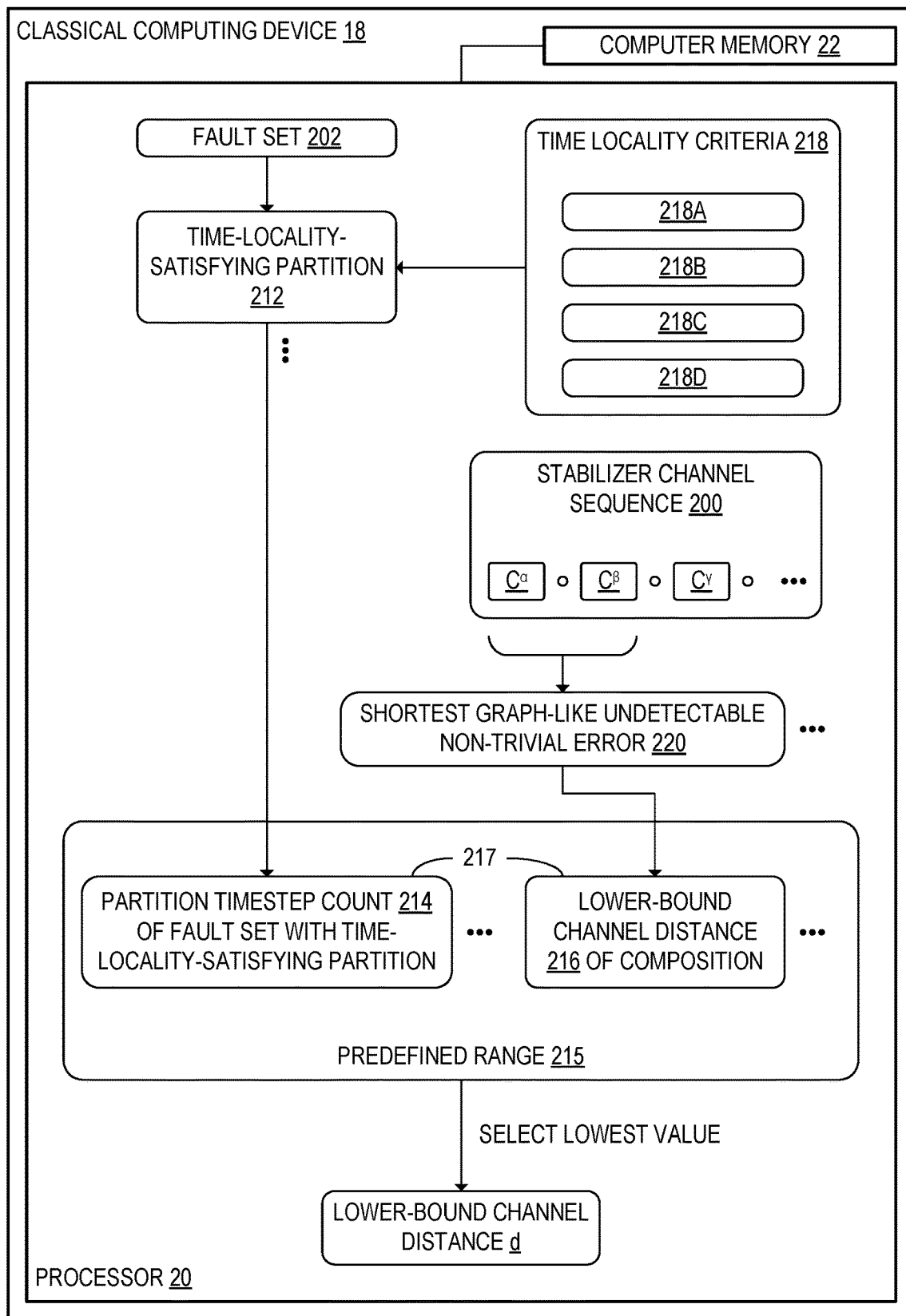
FIG. 10B schematically shows the classical computing device when a plurality of time-locality-satisfying partitions of a fault set are computed, according to the example of FIG. 10A.

FIG. 10B schematically shows the classical computing device 18 in additional detail when the lower-bound channel distance d is computed. The indication of the time-locality-satisfying partition 212 may, for example, be received from an additional computing process that checks a plurality of time locality criteria 218 for different partitions of the fault sets 202. In such examples, each of the time-locality-satisfying partitions 212 is a partition of the corresponding fault set 202 that fulfills the time locality criteria 218.

The time locality criteria 218 may include a criterion 218A that a first channel check set $\Sigma_1$ associated with a first partition timestep of the plurality of partition timesteps encodes a function of an input code syndrome $s_{in}$ of an input error $E_{in}$, and of each of the elementary faults 204 included in a first disjoint subset $\mathcal{F}_1$ of the fault set 202. In addition, the plurality of time locality criteria 218 may further include a criterion 218B that when no faults occur at the stabilizer channel 41, the input code syndrome $s_{in}$ is isomorphic to the first channel check set $\Sigma_1$.

The time locality criteria 218 may further include a criterion 218C that a plurality of additional channel check sets $\Sigma_j$ associated with subsequent partition timesteps j∈[2, T] of the plurality of partition timesteps each encode respective functions of the elementary faults 204 included in corresponding disjoint unions. These disjoint unions are disjoint unions $\mathcal{F}_{j-1} \sqcup \mathcal{F}_j$ of a previous-timestep disjoint subset $\mathcal{F}_{j-1}$ associated with a previous partition timestep j−1 of the plurality of partition timesteps, and a current-timestep disjoint subset $\mathcal{F}_j$ associated with a current partition timestep j of the plurality of partition timesteps.

The time locality criteria 218 may further include a criterion 218D that an output code syndrome $s_{out}$ of an output error $E_{out}$ is a function of the plurality of channel check sets $\Sigma_1 \sqcup \Sigma_2 \sqcup \ldots \sqcup \Sigma_T$, and of each of the elementary faults 204 included in a final disjoint subset $\mathcal{F}_T$. The final disjoint subset $\mathcal{F}_T$ is associated with a final partition timestep T of the plurality of partition timesteps.

FIG. 10B further shows the computation of the lower-bound channel distances 216 of the compositions of stabilizer channels 41. In the example of FIG. 10B, the processor 20 is configured to compute the lower-bound channel distances 216 of the compositions of the adjacent pairs of stabilizer channels 41 at least in part by, for each of the compositions, computing a shortest graph-like undetectable non-trivial error 220 of the composition. The processor 20 is further configured to identify the length of the shortest graph-like undetectable non-trivial error 220 as the lower-bound channel distance of the composition.

Subsequently to computing the lower-bound channel distances 216 and receiving the indications of the time-locality-satisfying partitions 212, the processor 20 is further configured to select, as the lower-bound channel distance d of the stabilizer channel sequence 200, a lowest value among the plurality of lower-bound channel distances 216 of the compositions and each of the partition timestep counts 214 that has a respective time-locality-satisfying partition 212. As shown in the example of FIG. 10B, the partition timestep counts 214 and the lower-bound channel distances 216 of the compositions are candidate channel distance values 217. Thus, either a lower-bound channel distance 216 of a composition or a partition timestep count 214 may act as a lower bound on the number of correctable errors that can occur at the stabilizer channel sequence 200. The processor 20, in the example of FIG. 10B, is configured to search for the lower-bound channel distance d over a predefined range 215 of the candidate channel distance values 217.

The processor 20 is further configured to output the lower-bound channel distance d. For example, the processor 20 may output the lower-bound channel distance d to a quantum circuit programming interface at which a user specifies properties of a quantum circuit for execution at the quantum computing device 16. Thus, the user may obtain information related to the fault tolerance properties of the quantum circuit.

Figure 10C:
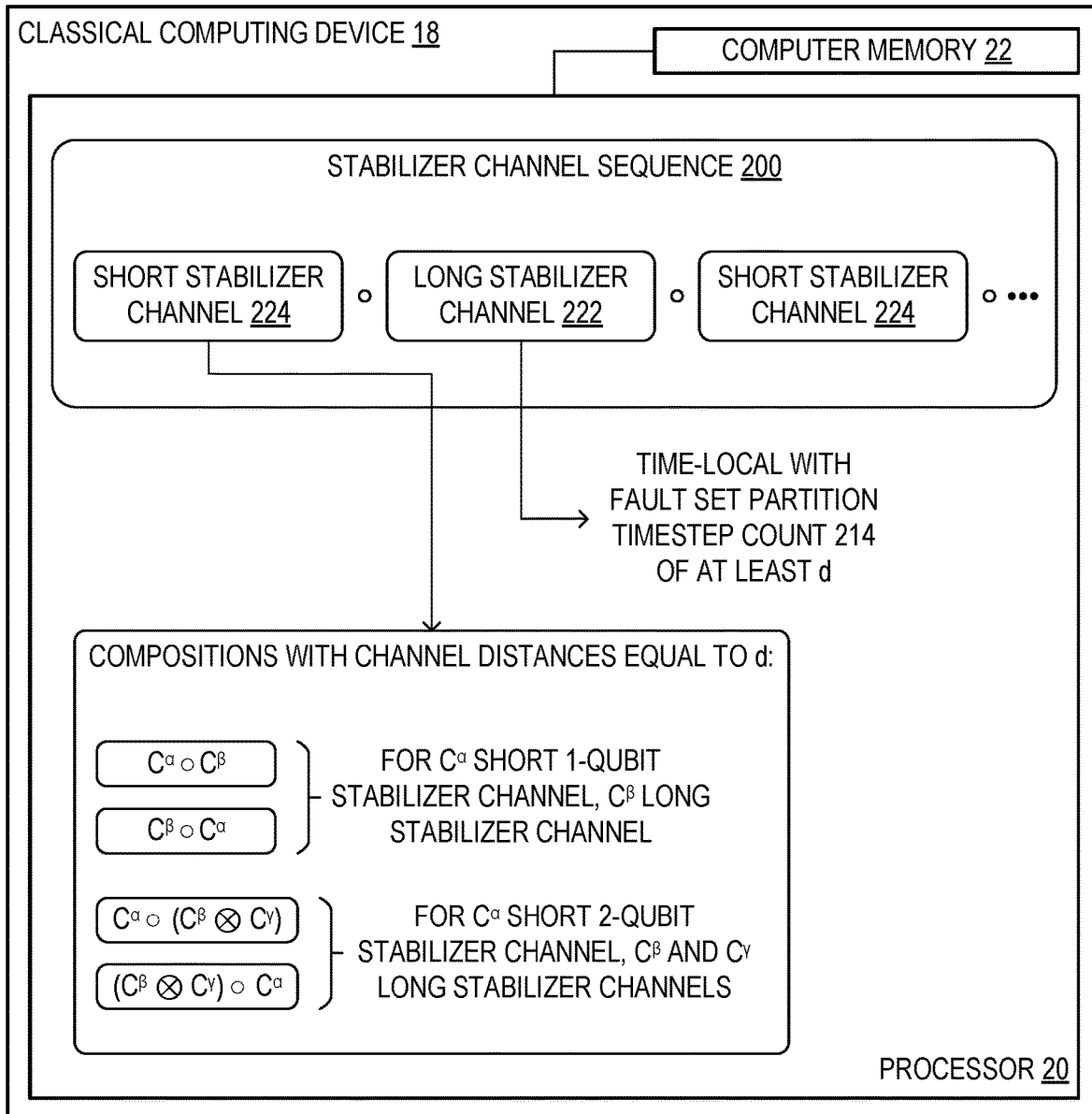
FIG. 10C schematically shows the classical computing device when the stabilizer channel sequence alternates between long stabilizer channels and short stabilizer channels, according to the example of FIG. 10A.

In some examples, as shown in FIG. 10C, the processor 20 may be configured to simplify the process of determining the lower-bound channel distance d at least in part by categorizing the stabilizer channels 41 as either long stabilizer channels 222 or short stabilizer channels 224. In the example of FIG. 10C, the at least one stabilizer channel 41 that is checked for time locality is a long stabilizer channel 222 that is time-local for a partition timestep count 214 greater than or equal to the lower-bound channel distance d of the stabilizer channel sequence 200. The stabilizer channel sequence 200 further includes one or more short stabilizer channels 224 for which the following compositions have respective lower-bound channel distances 216 equal to the lower-bound channel distance d. Depending on whether the short stabilizer channel 224 acts on one or two qubits, the short stabilizer channel 224 satisfies either conditions 1) and 2) or conditions 3) and 4).

1) When the short stabilizer channel $\mathcal{C}^\alpha$ is a one-qubit stabilizer channel, a composition $\mathcal{C}^\alpha \circ \mathcal{C}^\beta$ of the short stabilizer channel $\mathcal{C}^\alpha$ with a long stabilizer channel $\mathcal{C}^\beta$ included among the one or more long stabilizer channels 222 of the stabilizer channel sequence 200. $\mathcal{C}^\beta$ is also a one-qubit stabilizer channel.

2) When the short stabilizer channel $\mathcal{C}^\alpha$ is a one-qubit stabilizer channel, a composition $\mathcal{C}^\beta \circ \mathcal{C}^\alpha$ of the long stabilizer channel $\mathcal{C}^\beta$ with the short stabilizer channel $\mathcal{C}^\alpha$.

3) When the short stabilizer channel $\mathcal{C}^\alpha$ is a two-qubit stabilizer channel, A composition $\mathcal{C}^\alpha \circ (\mathcal{C}^\beta \otimes \mathcal{C}^\gamma)$ of the short stabilizer channel $\mathcal{C}^\beta$ with a tensor product $\mathcal{C}^\beta \otimes \mathcal{C}^\gamma$ of the long stabilizer channel CB and one or more additional long stabilizer channels $\mathcal{C}^\gamma$. In this composition, $\mathcal{C}^\beta$ and $\mathcal{C}^\gamma$ are both one-qubit stabilizer channels.

4) When the short stabilizer channel Ca is a two-qubit stabilizer channel, a composition $(\mathcal{C}^\beta \otimes \mathcal{C}^\gamma) \cdot \mathcal{C}^\alpha$ of the tensor product $\mathcal{C}^\beta \otimes \mathcal{C}^\gamma$ with the short stabilizer channel $\mathcal{C}^\alpha$.

In examples in which the stabilizer channel sequence 200 alternates between stabilizer channels 41 that, for some value of d, respectively satisfy the properties of long stabilizer channels 222 and short stabilizer channels 224, the stabilizer channel sequence 200 as a whole has lower-bound channel distance equal to d. Accordingly, the processor 20 may be configured to determine the lower-bound channel distance d of the stabilizer channel sequence 200 by checking, for a predetermined range of candidate channel distance values, whether the stabilizer channel sequence 200 alternates between long stabilizer channels 222 and short stabilizer channels 224. Performing such a determination may speed up the process of computing the lower-bound channel distance d, due to involving lower-bound channel distance determinations for fewer stabilizer channel pairs compared to determining the lower-bound channel distances of all adjacent pairs in the stabilizer channel sequence 200.

Computing the lower-bound channel distance d as discussed above has a time complexity of $\mathcal{O}(N^2 \log N)$, where N is the number of physical qubit operations that are performed when the stabilizer channel 41 is implemented. In the above expression for the time complexity of determining the lower-bound channel distance d, the channel check matrix $A_\Sigma$ and the logical effect matrix $A_L$ of the stabilizer channel 41 are assumed to be already known. For a stabilizer channel sequence with a maximum number of gates $N_{max}$ in each of its component stabilizer channels, then checking M combinations of channels has a time complexity of $\mathcal{O}(MN_{max}^2 \log N_{max})$.

The above techniques have a lower time complexity than computing the lower-bound channel distance d by checking the lower-bound channel distance of the entire stabilizer channel sequence via a brute-force approach, without utilizing time locality properties. Brute-force checking the lower-bound channel distance has a time complexity of $\mathcal{O}((N'N_{max})^2 \log(N'N_{max}))$, where N' is the number of component stabilizer channels that make up the stabilizer channel sequence. The brute-force approach is at least $N'^2/M$ times slower than utilizing time locality properties to compute the lower-bound channel distance d as discussed above.

The following discussion relates to the identification of hook faults at a stabilizer channel and determining the severity of those hook faults.

Given a stabilizer channel and a local stochastic Pauli noise model with a fault set $\mathcal{F}$, the fault distance could, in principle, be computed directly by enumerating faults to find the lowest-weight non-trivial fault. However, the time complexity of such a brute-force approach is exponential in the size of the fault set $\mathcal{F}$. In some examples, rather than relying on brute force checking, the channel check matrix $A_\Sigma$ may be expressed as a graph in which undetectable faults correspond to cycles. From this graph, the fault distance of the stabilizer channel may be computed more efficiently.

Consider a stabilizer channel which has a channel check matrix $A_\Sigma$ expressed over a check basis $\Sigma$. The channel check matrix $A_\Sigma$ is described as graph-like when there exists a choice of check basis $\Sigma'$ that has the same span as $\Sigma$, such that each column of the corresponding transformed channel check matrix $A_{\Sigma'}$ has a Hamming weight of one or two. A syndrome graph $G=(V, E)$ may then be constructed from the transformed channel check matrix $A_{\Sigma'}$ as follows. A vertex of the syndrome graph G is included in the vertex set V for each row of $A_{\Sigma'}$, along with an additional boundary vertex. For each weight-2 column of $A_{\Sigma'}$, an edge connecting the two vertices corresponding to that row's support is included in the edge set E. For each weight-1 column of $A_{\Sigma'}$, an edge connecting the boundary vertex to the vertex corresponding to that row's support is included in E. By construction, every edge in the edge set E corresponds to an elementary fault in $\mathcal{F}$.

The cycle space of the syndrome graph G may be used to relate undetectable faults to cycles in G. A subset of edges $E' \subset E$ is a cycle if the sub-graph (V, E') has even-degree vertices. In addition, an indicator vector $v_E$ may be defined for each set of edges. Since the symmetric difference of two cycles also forms a cycle, the indicator vectors $v_E$ for which E is a cycle form a vector space over $\mathbb{F}_2$. This vector space is referred to as the cycle space of the graph G.

There exist efficient algorithms that may be used to determine whether the channel check matrix $A_\Sigma$ is graph-like, and to construct the corresponding decoding graph for the channel check matrix $A_\Sigma$. Such an algorithm may be used when identifying severe hook faults, as discussed in further detail below.

When the channel check matrix $A_\Sigma$ is graph-like, the fault distance d of the stabilizer channel is the minimum weight of a cycle in G that has a non-trivial logical action, as defined by the logical effect matrix A. FIG. 11 shows an algorithm 300 via which the processor 20 may be configured to compute the minimum weight of a cycle in the syndrome graph G that has non-zero error. As an input, the algorithm 300 is configured to receive a specification of an undirected graph G with edge weights $w: E \to \mathbb{R}^{>0}$. The inputs further include an error map $r: E \to \mathbb{F}_2^m$.

When performing the algorithm 300, the processor 20 may be configured to initialize the minimum weight $w_{min}$ at $\infty$. The processor 20 may be further configured to execute a minimum weight updating loop for each of the vertices $v \in V$ of the syndrome graph G. In this minimum weight updating loop, the processor 20 may be configured to solve a Single Source Shortest Paths problem for the syndrome graph G and the edge weights w for paths with weights less than $w_{min}$.

The processor 20 may be further configured to set V' equal to V−{v}, ordered such that the shortest distance to the vertex v is non-decreasing. In the minimum weight updating loop, the processor 20 may be further configured to define a matrix $R: V \to \mathbb{F}_2^m$ that indicates vertices with undefined errors. In addition, the processor 20 may be further configured to set the matrix element R(v) to 0.

The processor 20 may be further configured to execute a vector subset loop as part of the minimum weight updating loop. In the vector subset loop, for each $v' \in V'$, while $W(v') < w_{min}/2$, the processor 20 is further configured to execute a loop over the neighbors u of v'. In this loop, for a value W(u) equal to the shortest distance from the vertex v to another vertex u, the processor 20 is further configured to determine whether W(u)+w(u, v')=W(v'). If so, and if R(v') is an undefined error, the processor 20 may be further configured to set R(v') to R(u)+r (u, v'). If W(u)+w(u, v')≠W(v'), and if R(v')≠R(u)+r (u, v'), the processor 20 may instead be configured to set $w_{min}$ to $\min(w_{min}, 2W(v'))$.

As part of the vector subset loop, the processor 20 may be further configured to execute an additional loop over the neighbors u of v'. In this additional loop, if W(u)+w(u, v')≠W(v'), and if R(u) is defined, the processor 20 may be further configured to determine whether R(v') ≠R(u)+r (u, v'). If so, the processor 20 may be further configured to set a weight $w_{odd\ cycle}$ to W(u)+W(v')+w(u, v'), and to set $w_{min}$ to $\min(w_{min}, w_{odd\ cycle})$.

Subsequently to executing the minimum weight updating loop, the processor 20 may be further configured to return $w_{min}$ as the output of the algorithm 300.

Information related to the syndrome graph G and its non-trivial cycles may be used in some examples to speed up the computation of the minimum weight $w_{min}$. For example, when a topological code is used, the syndrome graph G may be a cellulation of an underlying smooth topological manifold. In such examples, the cycles corresponding to logical fault configurations correspond to non-contractible loops, while cycles with trivial action on the stabilizer channel are contractible loops. In some such examples, each non-trivial cycle in the syndrome graph G passes through the boundary vertex. Thus, the runtime of the algorithm 300 may be considerably reduced by performing the minimum weight updating loop only for the boundary vertex.

Figure 12A:
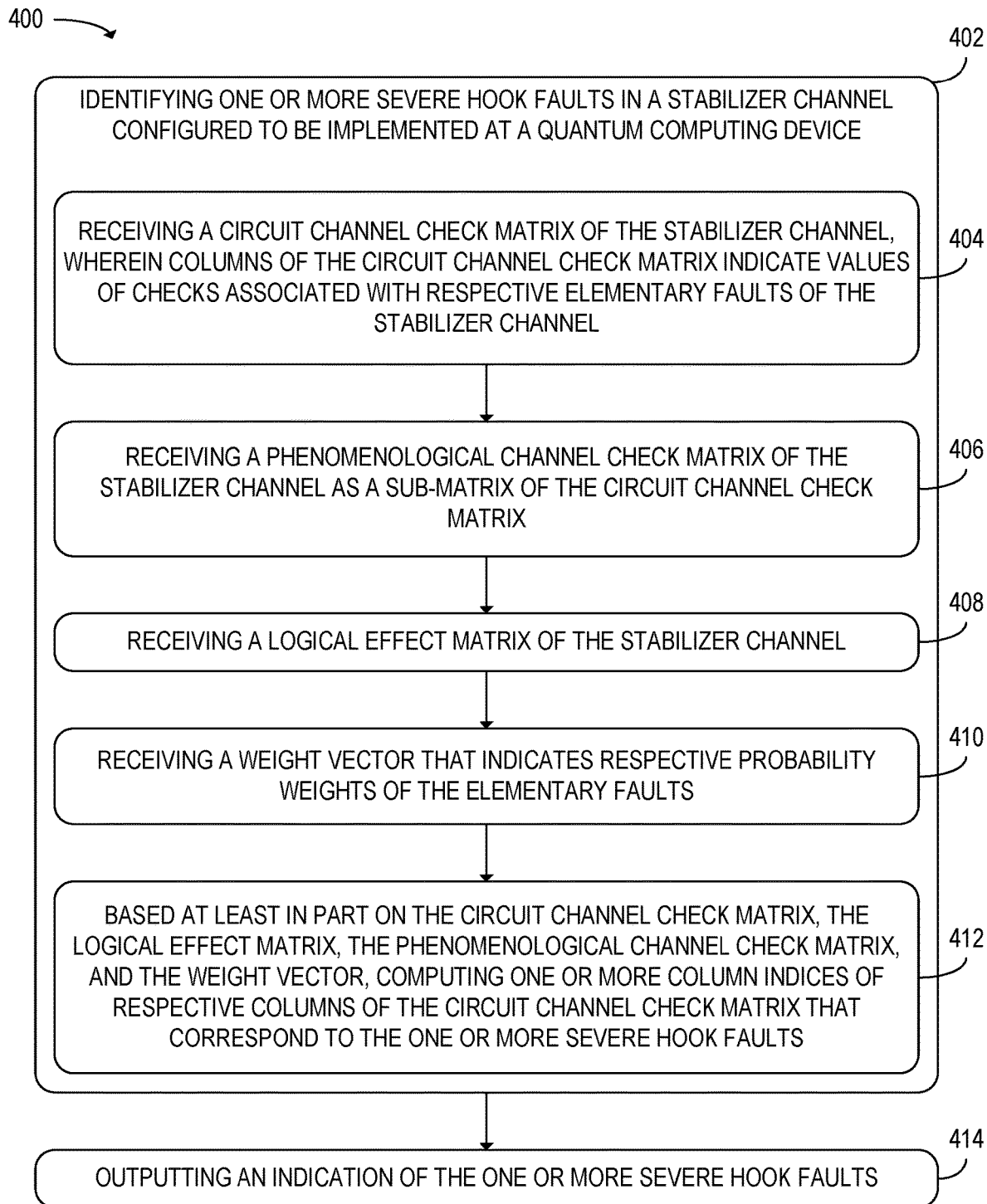
FIG. 12A shows a flowchart of a method for use with a computing system to determine the severity of one or more hook faults that may occur at a stabilizer channel, according to the example of FIG. 1.

FIG. 12A shows a flowchart of a method 400 for use with a computing system to determine the severity of one or more hook faults that may occur at a stabilizer channel. At step 402, the method 400 includes identifying one or more severe hook faults in a stabilizer channel configured to be implemented at a quantum computing device. FIG. 12A further shows steps 404, 406, 408, 410, and 412, which the computing system is configured to perform when performing step 402 in order to identify the one or more severe hook faults.

At step 404, step 402 further includes receiving a circuit channel check matrix of the stabilizer channel. The columns of the circuit channel check matrix indicate values of checks associated with respective elementary faults of the stabilizer channel. In addition, at step 406, step 402 further includes receiving a phenomenological channel check matrix of the stabilizer channel. The phenomenological channel check matrix forms a sub-matrix of the circuit channel check matrix. The phenomenological channel check matrix and the circuit noise channel check matrix respectively indicate a plurality of phenomenological noise elementary faults and a plurality of circuit noise elementary faults included among the plurality of elementary faults of the stabilizer channel. The circuit channel check matrix and the phenomenological channel check matrix both have a number of rows equal to the number of checks of the stabilizer circuit. The circuit channel check matrix has a number of columns equal to the number of circuit noise elementary faults, and the phenomenological channel check matrix has a number of columns equal to the number of phenomenological noise elementary faults.

As discussed above, the plurality of phenomenological noise elementary faults may include a first plurality of one-qubit Pauli errors respectively associated with idle instructions and a first plurality of outcome flips respectively associated with measurement instructions. The plurality of circuit noise elementary faults may include a second plurality of one-qubit Pauli errors respectively associated with single-qubit stabilizer instructions, a plurality of two-qubit Pauli errors respectively associated with two-qubit stabilizer instructions, and a second plurality of outcome flips respectively associated with measurement instructions.

The one or more hook faults, as discussed above, are one or more circuit noise elementary faults that have respective syndromes and logical effects that differ from those of each of the phenomenological noise elementary faults. In addition, the one or more severe hook faults are hook faults that overlap with one or more respective minimal-weight non-trivial undetectable faults. As discussed in further detail below, the one or more severe hook faults may be identified by identifying one or more hook faults and checking those one or more hook faults for overlap with the one or more respective minimal-weight non-trivial undetectable faults in terms of their syndromes and logical effects.

At step 408, step 402 further includes receiving a logical effect matrix of the stabilizer channel. The logical effect matrix encodes a respective logical effect of each of the elementary faults of the stabilizer channel. Each of the logical effects may be a bit vector that encodes an effect of the corresponding elementary fault on logical information that is stored in output qubits of the stabilizer channel. That logical information may be extracted by inferring logical measurements outcomes from circuit outcomes of the stabilizer channel, as obtained at the classical computing device from the qubit reader. The number of rows in the logical effect matrix depends upon the logical action of the stabilizer channel. For example, the number of rows in the logical effect matrix may be double the number of logical qubits. The number of columns of the logical effect matrix is equal to the number of circuit noise elementary faults. Accordingly, the logical effect matrix has the same number of columns as the circuit channel check matrix.

At step 410, step 402 further includes receiving a weight vector that indicates respective probability weights of the elementary faults. These elementary faults may be the circuit noise elementary faults. In some examples, the probability weights of the elementary faults are each computed as a difference between a logarithm of a probability that no fault occurs at the stabilizer channel and a logarithm of a probability that the elementary fault occurs at the stabilizer channel. Thus, in such examples, the weights wt(F) are each computed as wt(F)=log Pr(Ø)–log Pr(F).

At step 412, step 402 further includes computing one or more column indices of respective columns of the circuit channel check matrix that correspond to the one or more severe hook faults. These column indices are computed based at least in part on the circuit channel check matrix, the logical effect matrix, the phenomenological channel check matrix, and the weight vector. Accordingly, the column indices indicate which, if any, of the circuit noise elementary faults are severe hook faults.

At step 414, the method 400 further includes outputting the indication of the one or more severe hook faults. In examples in which the computing system determines that none of the circuit noise elementary faults are severe hook faults, the computing system is instead configured to output an indication that no severe hook faults were found.

Figure 12B:
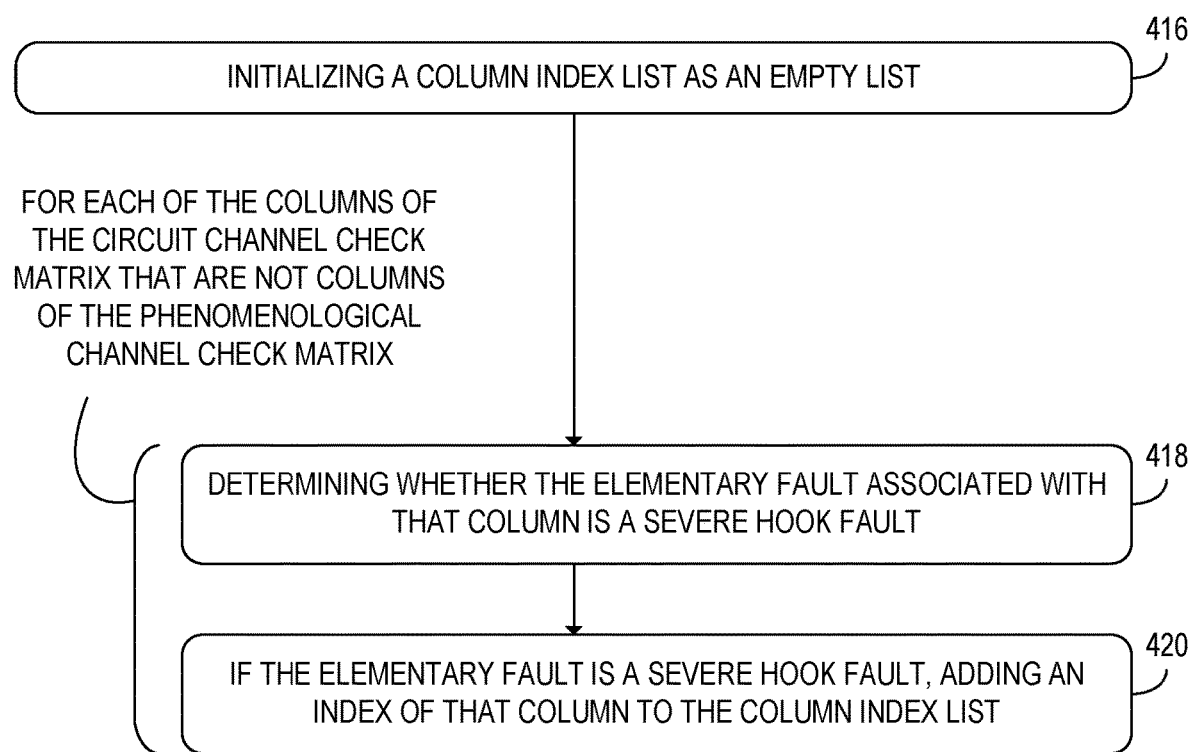
FIGS. 12B-12D show additional steps of the method of FIG. 12A that may be performed in some examples when computing one or more column indices that correspond to one or more severe hook faults.
Figure 12C:
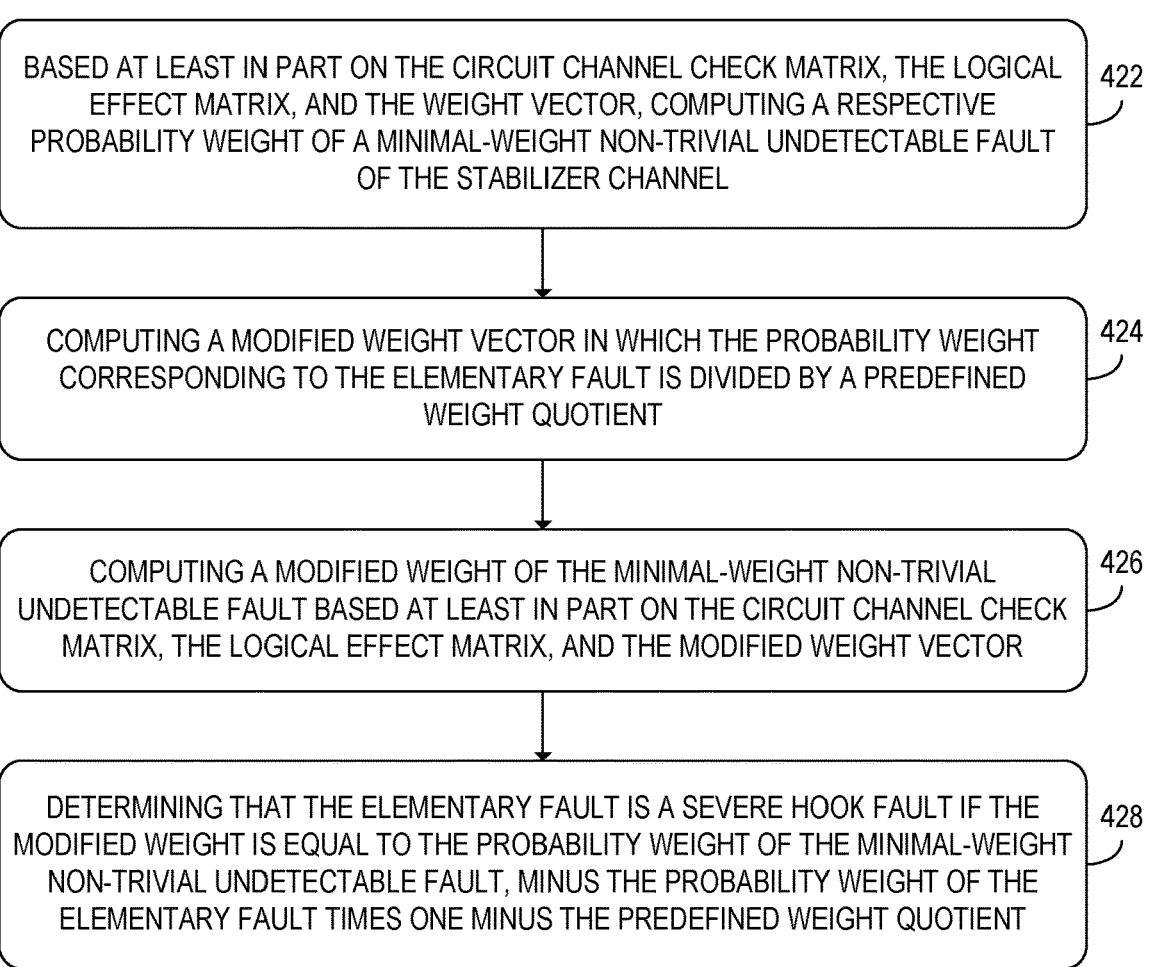
Figure 12D:
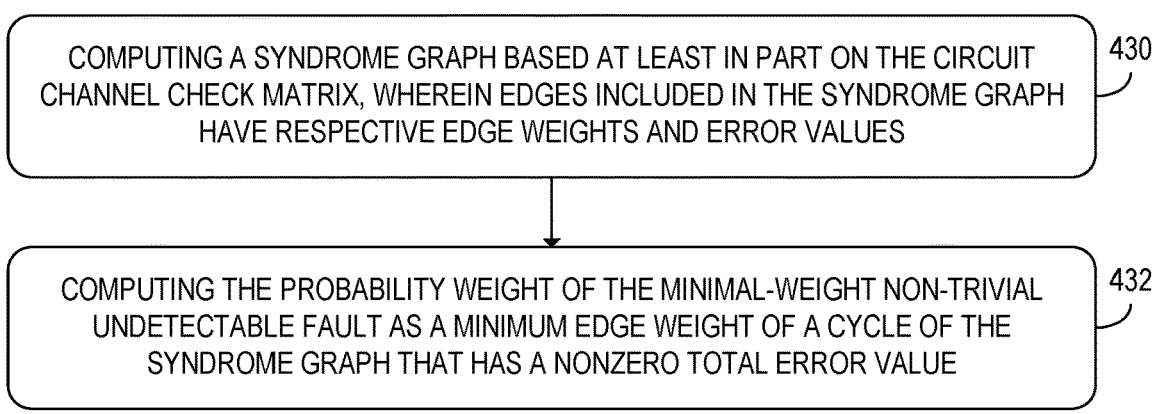

FIGS. 12B-12D show additional steps of the method 400 that are performed in some examples when performing step 412. As shown in FIG. 12B, at step 416, the method 400 may further include initializing a column index list as an empty list. FIG. 12B further includes steps 418 and 420, which may be performed for each of the columns of the circuit channel check matrix that are not columns of the phenomenological channel check matrix. At step 418, the method 400 may further include determining whether the elementary fault associated with that column is a severe hook fault. At step 420, the method 400 may further include adding an index of that column to the column index list if the elementary fault is a severe hook fault. Thus, the list of the column indices corresponding to the severe hook faults may be iteratively constructed.

FIG. 12C shows steps of the method 400 that may be performed during step 418 to determine whether the elementary fault associated with a column of the circuit channel check matrix is a severe hook fault. At step 422, based at least in part on the circuit channel check matrix, the logical effect matrix, and the weight vector, the method 400 may further include computing a respective probability weight of a minimal-weight non-trivial undetectable fault of the stabilizer channel. As discussed in further detail below with reference to FIG. 12D, the probability weight of the minimal-weight non-trivial undetectable fault may be computed at least in part with the algorithm 300 of FIG. 11.

At step 424, the method 400 may further include computing a modified weight vector in which the probability weight corresponding to the elementary fault is divided by a predefined weight quotient. Accordingly, for a weight vector w, step 424 may include computing the modified weight vector w' by setting a probability weight $w_c$ equal to $w_c/q_w$, where $w_c$ is the element of w corresponding to a column c, and where $q_w$ is the predefined weight quotient. In some examples, $q_w=2$.

At step 426, the method 400 may further include computing a modified weight of the minimal-weight non-trivial undetectable fault based at least in part on the circuit channel check matrix, the logical effect matrix, and the modified weight vector. The modified weight may also be computed at least in part by executing the algorithm 300 of FIG. 11, but with the modified weight vector replacing the original weight vector as an input.

At step 428, the method 400 may further include determine that the elementary fault is a severe hook fault if the modified weight is equal to the probability weight of the minimal-weight non-trivial undetectable fault, minus the probability weight of the elementary fault times one minus the predefined weight quotient. Accordingly, the method 400 includes checking whether $w'_0=w_0-(1-q_w)w_c$, where $w'_0$ is the modified weight and $w_0$ is the weight of the probability of the minimal-weight non-trivial undetectable fault prior to the modification. In examples in which $$q_w = 2, w'_0 = w_0 - \frac{w_c}{2}.$$

FIG. 12D shows additional steps of the method 400 that may be performed to determine the probability weight of the minimal-weight non-trivial undetectable fault. At step 430, the method 400 may further include computing a syndrome graph based at least in part on the circuit channel check matrix. The edges included in the syndrome graph may each have respective edge weights and error values. The syndrome graph may be constructed at least in part by At step 432, the method 400 may further include computing the probability weight of the minimal-weight non-trivial undetectable fault as a minimum edge weight of a cycle of the syndrome graph that has a nonzero total error value. This probability weight may be computed using the algorithm 300. In addition, the algorithm 300 may be used to compute the modified weight.

Figure 13A:
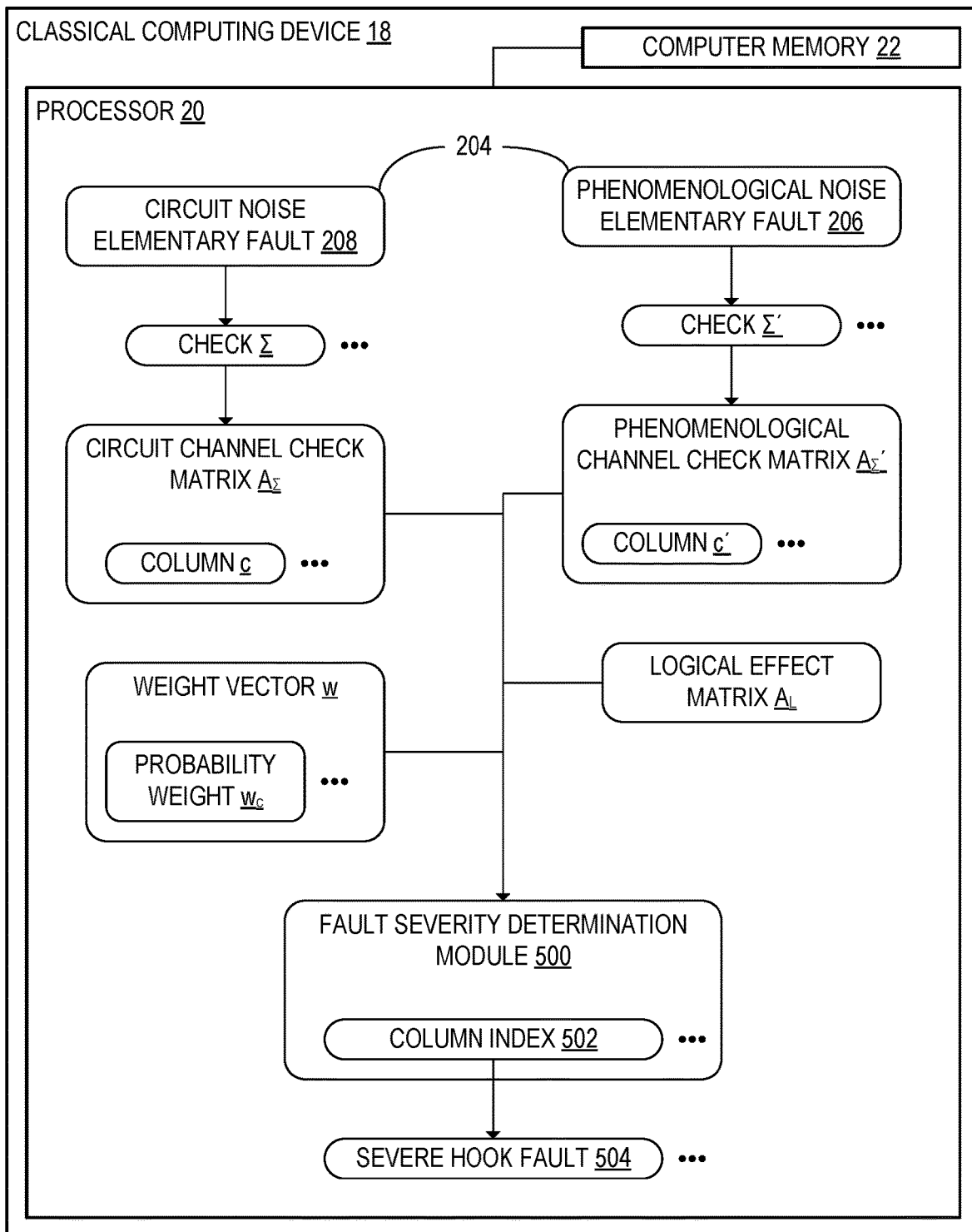
FIG. 13A schematically shows the classical computing device when the one or more processing devices are configured to identify one or more severe hook faults in a stabilizer channel, according to the example of FIG. 1.

FIG. 13A schematically shows the classical computing device 18 when the processor 20 is configured to identify one or more severe hook faults 504 in a stabilizer channel 41 configured to be implemented at a quantum computing device 16. As shown in the example of FIG. 13A, the processor 20 is configured to execute a fault severity determination module 500. At the fault severity determination module 500, the processor 20 is configured to receiving a circuit channel check matrix $A_\Sigma$ associated with the stabilizer channel 41. The columns c of the circuit channel check matrix $A_\Sigma$ indicate values of checks $\Sigma$ associated with respective elementary faults 204 of the stabilizer channel 41. The elementary faults 204 associated with the circuit channel check matrix $A_\Sigma$ are the plurality of circuit noise elementary faults 208. The checks $\Sigma$ associated with the elementary faults 204 are parities of respective measurement outcome subsets of the stabilizer channel 41. When no faults occur at the stabilizer channel 41, each of the checks $\Sigma$ may be equal to zero. Alternatively, each of the checks $\Sigma$ may be equal to one.

The processor 20 is further configured to receive a phenomenological channel check matrix $A_{\Sigma'}$ of the stabilizer channel 41. The phenomenological channel check matrix $A_{\Sigma'}$ is a sub-matrix of the circuit channel check matrix $A_\Sigma$ and indicates values of checks $\Sigma'$ associated with the plurality of phenomenological noise elementary faults 206.

The processor 20 is further configured to receiving a logical effect matrix $A_L$ of the stabilizer channel 41. The logical effect matrix $A_L$ encodes a respective logical effect of each of the circuit noise elementary faults 208 of the stabilizer channel 41. Each of the logical effects may be a bit vector that encodes an effect of the corresponding circuit noise elementary fault 208 on logical information that is stored in output qubits of the stabilizer channel 41 and is extracted via inferring logical measurements outcomes from circuit outcomes of the stabilizer channel 41.

The processor 20 is further configured to receive a weight vector w that indicates respective probability weights $w_c$ of the circuit noise elementary faults 208. In some examples, the probability weights $w_c$ of the circuit noise elementary faults 208 are each computed as a difference between a logarithm of a probability that no fault occurs at the stabilizer channel 41 and a logarithm of a probability that the circuit noise elementary fault occurs at the stabilizer channel 41.

At the fault severity determination module 500, based at least in part on the circuit channel check matrix $A_\Sigma$, the logical effect matrix $A_L$, the phenomenological channel check matrix $A_{\Sigma'}$, and the weight vector w, the processor 20 is further configured to compute one or more column indices 502 of respective columns c of the circuit channel check matrix $A_\Sigma$ that correspond to the one or more severe hook faults 504.

Subsequently to computing the one or more column indices 502, the processor 20 is further configured to output an indication of the one or more severe hook faults 504, as indicated by the one or more column indices 502.

Figure 13B:
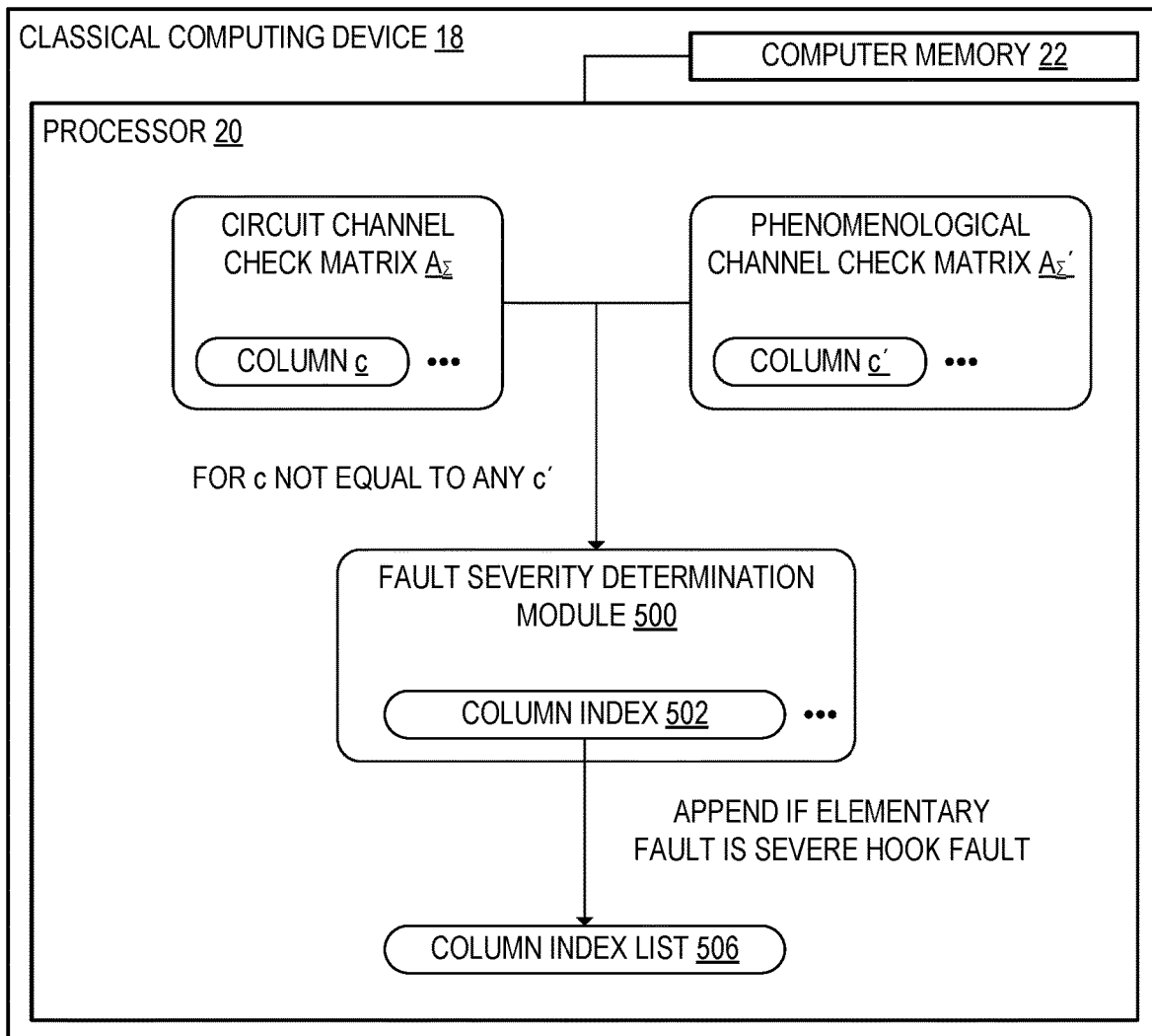
FIG. 13B schematically shows the classical computing device when the one or more processing devices are configured to construct a column index list of the one or more column indices that correspond to the one or more severe hook faults, according to the example of FIG. 13A.

FIG. 13B schematically shows the classical computing device 18 when the processor 20 is configured to construct a column index list 506 of the one or more column indices 502 that correspond to the one or more severe hook faults 504. The processor 20 may be configured to compute the one or more column indices 502 at least in part by initializing the column index list 506 as an empty list. For each of the columns c of the circuit channel check matrix that are not columns c' of the phenomenological channel check matrix $A_{\Sigma'}$, the processor 20 may be further configured to determine whether the elementary fault 204 associated with that column c is a severe hook fault 504. If the elementary fault 204 is a severe hook fault 504, the processor 20 may be further configured to add an index of that column c to the column index list 506. Otherwise, the processor 20 may be further configured to leave the column index list 506 unchanged in that iteration of the "for" loop in which the elementary faults 204 are checked for severity.

Figure 13C:
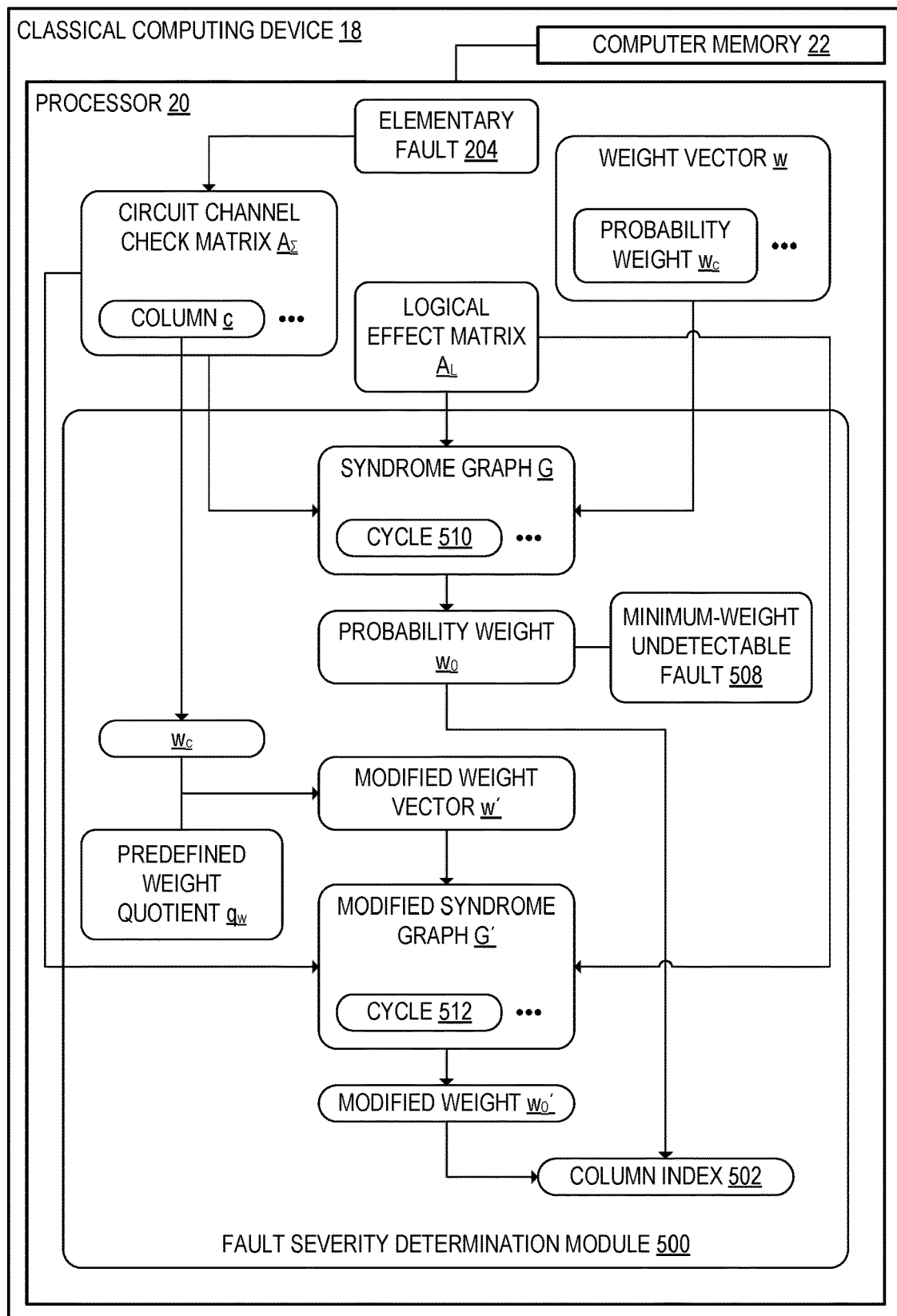
FIG. 13C schematically shows the classical computing device when the one or more processing devices are configured to determine whether an elementary fault is a severe hook fault, according to the example of FIG. 13A.

FIG. 13C schematically shows the classical computing device 18 when the processor 20 is configured to determine whether an elementary fault 204 is a severe hook fault 504. Based at least in part on the circuit channel check matrix $A_\Sigma$, the logical effect matrix $A_L$, and the weight vector w, the processor 20 may be further configured to compute a respective probability weight $w_0$ of a minimal-weight non-trivial undetectable fault 508 of the stabilizer channel 41. The minimal-weight non-trivial undetectable fault 508 is a fault with a lowest probability weight $w_c$ among the faults of the stabilizer channel 41 that have syndromes equal to zero. In the example of FIG. 13C, the processor 20 is configured to compute the probability weight $w_0$ of the minimal-weight non-trivial undetectable fault 508 using the algorithm 300 of FIG. 11, in which the processor 20 computes the minimum weight of a cycle 510 of a syndrome graph G. The syndrome graph G may be computed based at least in part on the circuit channel check matrix $A_\Sigma$, the logical effect matrix $A_L$, and the weight vector w. The edges included in the syndrome graph G may have respective edge weights and error values, as discussed above with reference to FIG. 11. The processor 20 may be configured to compute the probability weight $w_0$ of the minimal-weight non-trivial undetectable fault 508 as a minimum edge weight of a cycle 510 of the syndrome graph that has a nonzero total error value.

In the example of FIG. 13C, the processor 20 is further configured to compute a modified weight vector w' in which the probability weight $w_c$ corresponding to the elementary fault 204 is divided by a predefined weight quotient $q_w$. For example, the predefined weight quotient $q_w$ may be equal to 2. The processor 20 may be further configured to compute a modified weight $w_0'$ of the minimal-weight non-trivial undetectable fault 508 based at least in part on the circuit channel check matrix $A_\Sigma$, the logical effect matrix $A_L$, and the modified weight vector w'. To compute the modified weight $w_0'$, the processor 20 may be configured to apply the algorithm 300 of FIG. 11 to compute the minimum weight of a cycle 512 of a modified syndrome graph G'. The modified syndrome graph G', in such examples, is computed with the w' in place of the weight vector w.

The processor 20 may be further configured to determine that the elementary fault 204 is a severe hook fault 504 if the modified weight $w_0'$ is equal to the probability weight $w_0$ of the minimal-weight non-trivial undetectable fault 508, minus the probability weight $w_c$ of the elementary fault 204 times one minus the predefined weight quotient $q_w$. In examples in which the processor 20 determines that the above quantities are equal, the processor 20 may be further configured to add the column index 502 of the corresponding column c to the column index list 506.

Using the above techniques for identifying severe hook faults, a quantum computing device programmer may obtain an assessment of fault tolerance properties of a stabilizer channel 41 that may be executed at the quantum computing device 16. The severe hook fault identification allows the user to identify whether the stabilizer channel 41 is prone to faults that lead to uncorrectable errors in logical outcomes of the stabilizer channel 41. Accordingly, the above techniques for identifying severe hook faults may allow the user to program a reliable stabilizer channel more quickly and easily.

In some embodiments, the methods and processes described herein may be tied to a computing system of one or more computing devices. In particular, such methods and processes may be implemented as a computer-application program or service, an application-programming interface (API), a library, and/or other computer-program product.

Figure 14:
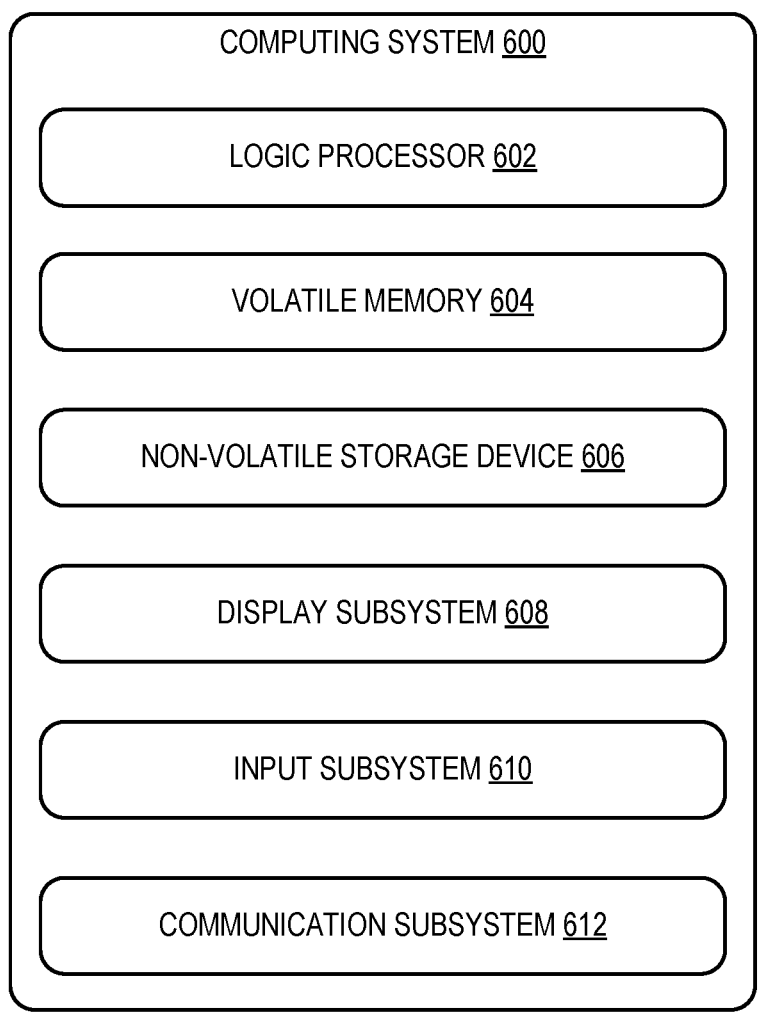
FIG. 14 shows a schematic view of an example computing environment in which the computing system of FIG. 1 may be instantiated.

FIG. 14 schematically shows a non-limiting embodiment of a computing system 600 that can enact one or more of the methods and processes described above. Computing system 600 is shown in simplified form. Computing system 600 may embody the computing system 10 described above and illustrated in FIG. 1. Components of computing system 600 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 14.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built in. Non-volatile storage device 606 may include optical memory, semiconductor memory, and/or magnetic memory, or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, camera, or microphone.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 600 to send and/or receive messages to and/or from other devices via a network such as the Internet.

The following paragraphs discuss several aspects of the present disclosure. According to one aspect of the present disclosure, a computing system is provided, including one or more processing devices configured to receive a stabilizer channel sequence for use with a quantum computing device. The stabilizer channel sequence includes three or more stabilizer channels. The one or more processing devices are further configured to receive respective fault sets associated with the stabilizer channels. The one or more processing devices are further configured to compute a lower-bound channel distance of the stabilizer channel sequence at least in part by computing respective lower-bound channel distances of a plurality of compositions of adjacent pairs of stabilizer channels in the stabilizer channel sequence. Computing the lower-bound channel distance further includes, for at least one stabilizer channel of the three or more stabilizer channels, for each of a plurality of partition timestep counts, receiving an indication of whether there exists a time-locality-satisfying partition of the fault set of that stabilizer channel that has that partition timestep count and for which the stabilizer channel is time-local. Computing the lower-bound channel distance further includes selecting, as the lower-bound channel distance of the stabilizer channel sequence, a lowest value among the plurality of lower-bound channel distances of the compositions and each of the partition timestep counts that has a respective time-locality-satisfying partition. The one or more processing devices are further configured to output the lower-bound channel distance. The above features may have the technical effect of identifying a lower bound on the number of correctable errors that may occur at the stabilizer channel.

According to this aspect, the fault sets each include a respective plurality of elementary faults and a plurality of compositions of the elementary faults. The above features may have the technical effect of determining the lower-bound channel distance with respect to both the elementary faults and the compositions of those elementary faults.

According to this aspect, the plurality of elementary faults may include a plurality of phenomenological noise elementary faults and a plurality of circuit noise elementary faults. The above features may have the technical effect of computing the lower-bound channel distance for two different independent stochastic Pauli noise models.

According to this aspect, the plurality of phenomenological noise elementary faults may include a first plurality of one-qubit Pauli errors respectively associated with idle instructions and a first plurality of outcome flips respectively associated with measurement instructions. The plurality of circuit noise elementary faults may include a second plurality of one-qubit Pauli errors respectively associated with single-qubit stabilizer instructions, a plurality of two-qubit Pauli errors respectively associated with two-qubit stabilizer instructions, and a second plurality of outcome flips respectively associated with measurement instructions. The above features may have the technical effect of modeling different types of phenomenological noise and circuit noise elementary faults when computing the lower-bound channel distance.

According to this aspect, each of the time-locality-satisfying partitions may fulfill a plurality of time locality criteria, including a criterion that a first channel check set associated with a first partition timestep of a plurality of partition timesteps encodes a function of an input code syndrome and of each of the elementary faults included in a first disjoint subset of the fault set. The above features may have the technical effect of allowing the partitions of the fault set to be tested for time locality.

According to this aspect, the plurality of time locality criteria may include a criterion that when no faults occur at the stabilizer channel, the input code syndrome is isomorphic to the first channel check set. The above features may have the technical effect of allowing the partitions of the fault set to be tested for time locality.

According to this aspect, the plurality of time locality criteria may include a criterion that a plurality of additional channel check sets associated with subsequent partition timesteps of the plurality of partition timesteps each encode respective functions of the elementary faults included in corresponding disjoint unions of a previous-timestep disjoint subset associated with a previous partition timestep of the plurality of partition timesteps and a current-timestep disjoint subset associated with a current partition timestep of the plurality of partition timesteps. The above features may have the technical effect of allowing the partitions of the fault set to be tested for time locality.

According to this aspect, the plurality of time locality criteria may include a criterion that an output code syndrome is a function of the plurality of channel check sets and of each of the elementary faults included in a final disjoint subset associated with a final partition timestep of the plurality of partition timesteps. The above features may have the technical effect of allowing the partitions of the fault set to be tested for time locality.

According to this aspect, the one or more processing devices may be configured to compute the lower-bound channel distances of the compositions of the adjacent pairs of stabilizer channels at least in part by, for each of the compositions, computing a shortest graph-like undetectable non-trivial error of the composition and identifying the length of the shortest graph-like undetectable non-trivial error as the lower-bound channel distance of the composition. The above features may have the technical effect of determining the lower-bound channel distances of the adjacent pairs of stabilizer channels.

According to this aspect, the at least one stabilizer channel may be a long stabilizer channel that is time-local for a partition timestep count greater than or equal to the lower-bound channel distance of the stabilizer channel sequence. The above features may have the technical effect of allowing the one or more processing devices to speed up the determination of the lower-bound channel distance when the stabilizer channels included in the stabilizer channel sequence have specific length properties.

According to this aspect, the stabilizer channel sequence may alternate between one or more long stabilizer channels and one or more short stabilizer channels for which the following compositions have respective lower-bound channel distances equal to the lower-bound channel distance of the stabilizer channel sequence: a composition of the short stabilizer channel with a long stabilizer channel included among the one or more long stabilizer channels, and a composition of the long stabilizer channel with the short stabilizer channel; or a composition of the short stabilizer channel with a tensor product of the long stabilizer channel and one or more additional long stabilizer channels, and a composition of the tensor product with the short stabilizer channel. The above features may have the technical effect of allowing the one or more processing devices to speed up the determination of the lower-bound channel distance when the stabilizer channels included in the stabilizer channel sequence have specific length properties.

According to this aspect, the one or more processing devices may be configured to search for the lower-bound channel distance over a predefined range of candidate channel distance values. The above features may have the technical effect of determining the lower-bound channel distance more quickly by searching over a range of high-probability candidate channel distance values.

According to another aspect of the present disclosure, a method for use with a computing system is provided. The method includes receiving a stabilizer channel sequence for use with a quantum computing device. The stabilizer channel sequence includes three or more stabilizer channels. The method further includes receiving respective fault sets associated with the stabilizer channels. The method further includes computing a lower-bound channel distance of the stabilizer channel sequence at least in part by computing respective lower-bound channel distances of a plurality of compositions of adjacent pairs of stabilizer channels in the stabilizer channel sequence. Computing the lower-bound channel distance further includes, for at least one stabilizer channel of the three or more stabilizer channels, for each of a plurality of partition timestep counts, receiving an indication of whether there exists a time-locality-satisfying partition of the fault set of that stabilizer channel that has that partition timestep count and for which the stabilizer channel is time-local. Computing the lower-bound channel distance further includes selecting, as the lower-bound channel distance of the stabilizer channel sequence, a lowest value among the plurality of lower-bound channel distances of the compositions and each of the partition timestep counts that has a respective time-locality-satisfying partition. The method further includes outputting the lower-bound channel distance. The above features may have the technical effect of identifying a lower bound on the number of correctable errors that may occur at the stabilizer channel.

According to this aspect, the fault sets may each include a respective plurality of elementary faults and a plurality of compositions of the elementary faults. The above features may have the technical effect of determining the lower-bound channel distance with respect to both the elementary faults and the compositions of those elementary faults.

According to this aspect, the plurality of elementary faults may include a plurality of phenomenological noise elementary faults and a plurality of circuit noise elementary faults. The above features may have the technical effect of computing the lower-bound channel distance for two different independent stochastic Pauli noise models.

According to this aspect, the plurality of phenomenological noise elementary faults may include a first plurality of one-qubit Pauli errors respectively associated with idle instructions and a first plurality of outcome flips respectively associated with measurement instructions. The plurality of circuit noise elementary faults may include a second plurality of one-qubit Pauli errors respectively associated with single-qubit stabilizer instructions, a plurality of two-qubit Pauli errors respectively associated with two-qubit stabilizer instructions, and a second plurality of outcome flips respectively associated with measurement instructions. The above features may have the technical effect of modeling different types of phenomenological noise and circuit noise elementary faults when computing the lower-bound channel distance.

According to this aspect, each of the time-locality-satisfying partitions may fulfill a plurality of time locality criteria, including a criterion that a first channel check set associated with a first partition timestep of a plurality of partition timesteps encodes a function of an input code syndrome and of each of the elementary faults included in a first disjoint subset of the fault set. The plurality of time locality criteria may further include a criterion that when no faults occur at the stabilizer channel, the input code syndrome is isomorphic to the first channel check set. The above features may have the technical effect of allowing the partitions of the fault set to be tested for time locality.

According to this aspect, the plurality of time locality criteria may include a criterion that a plurality of additional channel check sets associated with subsequent partition timesteps of the plurality of partition timesteps each encode respective functions of the elementary faults included in corresponding disjoint unions of a previous-timestep disjoint subset associated with a previous partition timestep of the plurality of partition timesteps and a current-timestep disjoint subset associated with a current partition timestep of the plurality of partition timesteps. The above features may have the technical effect of allowing the partitions of the fault set to be tested for time locality.

According to this aspect, the plurality of time locality criteria may include a criterion that an output code syndrome is a function of the plurality of channel check sets and of each of the elementary faults included in a final disjoint subset associated with a final partition timestep of the plurality of partition timesteps. The above features may have the technical effect of allowing the partitions of the fault set to be tested for time locality.

According to another aspect of the present disclosure, a computing system is provided, including one or more processing devices configured to receive a stabilizer channel sequence for use with a quantum computing device. The stabilizer channel sequence may include three or more stabilizer channels. The one or more processing devices are further configured to receive respective fault sets associated with the stabilizer channels. The fault sets each include a respective plurality of elementary faults and a plurality of compositions of the elementary faults. The one or more processing devices are further configured to compute a lower-bound channel distance of the stabilizer channel sequence at least in part by computing respective lower-bound channel distances of a plurality of compositions of adjacent pairs of stabilizer channels in the stabilizer channel sequence. Computing the lower-bound channel distance further includes, for at least one stabilizer channel of the three or more stabilizer channels, for each of a plurality of partition timestep counts included in a predefined range of candidate channel distance values, receiving an indication of whether there exists a time-locality-satisfying partition of the fault set of that stabilizer channel that has that partition timestep count and for which the stabilizer channel is time-local. Computing the lower-bound channel distance further includes selecting, as the lower-bound channel distance of the stabilizer channel sequence, a lowest value among the plurality of lower-bound channel distances of the compositions and each of the partition timestep counts that has a respective time-locality-satisfying partition. The one or more processing devices are further configured to output the lower-bound channel distance.

According to another aspect of the present disclosure, a computing system is provided, including one or more processing devices configured to identify one or more severe hook faults in a stabilizer channel configured to be implemented at a quantum computing device. Identifying the one or more severe hook faults includes receiving a circuit channel check matrix of the stabilizer channel. Columns of the circuit channel check matrix indicate values of checks associated with respective elementary faults of the stabilizer channel. Identifying the one or more severe hook faults further includes receiving a phenomenological channel check matrix of the stabilizer channel as a sub-matrix of the circuit channel check matrix. Identifying the one or more severe hook faults further includes receiving a logical effect matrix of the stabilizer channel and receiving a weight vector that indicates respective probability weights of the elementary faults. Based at least in part on the circuit channel check matrix, the logical effect matrix, the phenomenological channel check matrix, and the weight vector, identifying the one or more severe hook faults further includes computing one or more column indices of respective columns of the circuit channel check matrix that correspond to the one or more severe hook faults. The one or more processing devices may be further configured to output an indication of the one or more severe hook faults. The above features may have the technical effect of identifying faults that may produce uncorrectable errors in the logical outcomes of the stabilizer channel.

According to this aspect, the one or more processing devices may be configured to compute the one or more column indices at least in part by initializing a column index list as an empty list. Computing the one or more column indices may further include, for each of the columns of the circuit channel check matrix that are not columns of the phenomenological channel check matrix, determining whether the elementary fault associated with that column is a severe hook fault, and, if the elementary fault is a severe hook fault, adding an index of that column to the column index list. The above features may have the technical effect of generating a list of column indices that correspond to the severe hook faults.

According to this aspect, the one or more processing devices may be configured to determine whether the elementary fault is a severe hook fault at least in part by, based at least in part on the circuit channel check matrix, the logical effect matrix, and the weight vector, computing a respective probability weight of a minimal-weight non-trivial undetectable fault of the stabilizer channel. Determining whether the elementary fault is a severe hook fault may further include computing a modified weight vector in which the probability weight corresponding to the elementary fault is divided by a predefined weight quotient. Determining whether the elementary fault is a severe hook fault may further include computing a modified weight of the minimal-weight non-trivial undetectable fault based at least in part on the circuit channel check matrix, the logical effect matrix, and the modified weight vector. Determining whether the elementary fault is a severe hook fault may further include determine that the elementary fault is a severe hook fault if the modified weight is equal to the probability weight of the minimal-weight non-trivial undetectable fault, minus the probability weight of the elementary fault times one minus the predefined weight quotient. The above features may have the technical effect of computing whether an elementary fault of the stabilizer channel is a severe hook fault.

According to this aspect, the minimal-weight non-trivial undetectable fault may be a fault with a lowest probability weight among the faults of the stabilizer channel that have syndromes equal to zero. The above features may have the technical effect of allowing the one or more processing devices to identify the minimum-weight non-trivial undetectable fault.

According to this aspect, the one or more processing devices may be configured to determine the probability weight of the minimal-weight non-trivial undetectable fault at least in part by computing a syndrome graph based at least in part on the circuit channel check matrix. Edges included in the syndrome graph may have respective edge weights and error values. Determining the probability weight of the minimal-weight non-trivial undetectable fault may further include computing the probability weight of the minimal-weight non-trivial undetectable fault as a minimum edge weight of a cycle of the syndrome graph that has a nonzero total error value. The above features may have the technical effect of computing the probability weight of the minimal-weight non-trivial undetectable fault.

According to this aspect, the one or more severe hook faults may be one or more hook faults that overlap with one or more respective minimal-weight non-trivial undetectable faults. The above features may have the technical effect of allowing the one or more processing devices to utilize the identification of the one or more minimal-weight non-trivial undetectable faults when identifying the one or more severe hook faults.

According to this aspect, the plurality of elementary faults of the stabilizer channel may include a plurality of phenomenological noise elementary faults and a plurality of circuit noise elementary faults. The one or more hook faults may be one or more circuit noise elementary faults that have respective syndromes and logical effects that differ from those of each of the phenomenological noise elementary faults.

The above features may have the technical effect of identifying hook faults based on differences between two different independent stochastic Pauli noise models.

According to this aspect, the plurality of phenomenological noise elementary faults may include a first plurality of one-qubit Pauli errors respectively associated with idle instructions and a first plurality of outcome flips respectively associated with measurement instructions. The plurality of circuit noise elementary faults may include a second plurality of one-qubit Pauli errors respectively associated with single-qubit stabilizer instructions, a plurality of two-qubit Pauli errors respectively associated with two-qubit stabilizer instructions, and a second plurality of outcome flips respectively associated with measurement instructions. The above features may have the technical effect of modeling different types of phenomenological noise and circuit noise elementary faults when identifying the one or more severe hook errors.

According to this aspect, the checks associated with the elementary faults may be parities of respective measurement outcome subsets of the stabilizer channel. When no faults occur at the stabilizer channel, each of the checks may be equal to zero or each of the checks is equal to one. The above features may have the technical effect of using the circuit channel check matrix and the phenomenological channel check matrix to indicate elementary faults.

According to this aspect, the probability weights of the elementary faults may each be computed as a difference between a logarithm of a probability that no fault occurs at the stabilizer channel and a logarithm of a probability that the elementary fault occurs at the stabilizer channel. The above features may have the technical effect of computing the probability weights that are included in the weight vector.

According to this aspect, the logical effect matrix may encode a respective logical effect of each of the elementary faults of the stabilizer channel. Each of the logical effects may be a bit vector that encodes an effect of the corresponding elementary fault on logical information that is stored in output qubits of the stabilizer channel and is extracted via inferring logical measurements outcomes from circuit outcomes of the stabilizer channel. The above features may have the technical effect of specifying the logical effects of the elementary faults.

According to another aspect of the present disclosure, a method for use with a computing system is provided. The method includes identifying one or more severe hook faults in a stabilizer channel configured to be implemented at a quantum computing device. Identifying the one or more severe hook faults includes receiving a circuit channel check matrix of the stabilizer channel. Columns of the circuit channel check matrix indicate values of checks associated with respective elementary faults of the stabilizer channel. Identifying the one or more severe hook faults further includes receiving a phenomenological channel check matrix of the stabilizer channel as a sub-matrix of the circuit channel check matrix. Identifying the one or more severe hook faults further includes receiving a logical effect matrix of the stabilizer channel. Identifying the one or more severe hook faults further includes receiving a weight vector that indicates respective probability weights of the elementary faults. Identifying the one or more severe hook faults further includes, based at least in part on the circuit channel check matrix, the logical effect matrix, the phenomenological channel check matrix, and the weight vector, computing one or more column indices of respective columns of the circuit channel check matrix that correspond to the one or more severe hook faults. The method further includes outputting an indication of the one or more severe hook faults. The above features may have the technical effect of identifying faults that may produce uncorrectable errors in the logical outcomes of the stabilizer channel.

According to this aspect, computing the one or more column indices may include initializing a column index list as an empty list. Computing the one or more column indices may further include, for each of the columns of the circuit channel check matrix that are not columns of the phenomenological channel check matrix, determining whether the elementary fault associated with that column is a severe hook fault, and, if the elementary fault is a severe hook fault, adding an index of that column to the column index list. The above features may have the technical effect of generating a list of column indices that correspond to the severe hook faults.

According to this aspect, determining whether the elementary fault is a severe hook fault may include, based at least in part on the circuit channel check matrix, the logical effect matrix, and the weight vector, computing a respective probability weight of a minimal-weight non-trivial undetectable fault of the stabilizer channel. Determining whether the elementary fault is a severe hook fault may further include computing a modified weight vector in which the probability weight corresponding to the elementary fault is divided by a predefined weight quotient. Determining whether the elementary fault is a severe hook fault may further include computing a modified weight of the minimal-weight non-trivial undetectable fault based at least in part on the circuit channel check matrix, the logical effect matrix, and the modified weight vector. Determining whether the elementary fault is a severe hook fault may further include determining that the elementary fault is a severe hook fault if the modified weight is equal to the probability weight of the minimal-weight non-trivial undetectable fault, minus the probability weight of the elementary fault times one minus the predefined weight quotient. The above features may have the technical effect of computing whether an elementary fault of the stabilizer channel is a severe hook fault.

According to this aspect, the minimal-weight non-trivial undetectable fault may be a fault with a lowest probability weight among the faults of the stabilizer channel that have syndromes equal to zero. The above features may have the technical effect of allowing the one or more processing devices to identify the minimum-weight non-trivial undetectable fault.

According to this aspect, determining the probability weight of the minimal-weight non-trivial undetectable fault may include computing a syndrome graph based at least in part on the circuit channel check matrix. Edges included in the syndrome graph may have respective edge weights and error values. Determining the probability weight of the minimal-weight non-trivial undetectable fault may further include computing the probability weight of the minimal-weight non-trivial undetectable fault as a minimum edge weight of a cycle of the syndrome graph that has a nonzero total error value. The above features may have the technical effect of computing the probability weight of the minimal-weight non-trivial undetectable fault.

According to this aspect, the one or more severe hook faults may be one or more hook faults that overlap with one or more respective minimal-weight non-trivial undetectable faults. The plurality of elementary faults of the stabilizer channel may include a plurality of phenomenological noise elementary faults and a plurality of circuit noise elementary faults. The one or more hook faults may be one or more circuit noise elementary faults that have respective syndromes and logical effects that differ from those of each of the phenomenological noise elementary faults. The above features may have the technical effect of allowing the one or more processing devices to utilize the identification of the one or more minimal-weight non-trivial undetectable faults when identifying the one or more severe hook faults.

According to this aspect, the probability weights of the elementary faults may each be computed as a difference between a logarithm of a probability that no fault occurs at the stabilizer channel and a logarithm of a probability that the elementary fault occurs at the stabilizer channel. The above features may have the technical effect of computing the probability weights that are included in the weight vector.

According to this aspect, the logical effect matrix may encode a respective logical effect of each of the elementary faults of the stabilizer channel. Each of the logical effects may be a bit vector that encodes an effect of the corresponding elementary fault on logical information that is stored in output qubits of the stabilizer channel and is extracted via inferring logical measurements outcomes from circuit outcomes of the stabilizer channel. The above features may have the technical effect of specifying the logical effects of the elementary faults.

According to another aspect of the present disclosure, a computing system is provided, including one or more processing devices configured to identify one or more severe hook faults in a stabilizer channel configured to be implemented at a quantum computing device. Identifying the one or more severe hook faults includes receiving a circuit channel check matrix of the stabilizer channel. Columns of the circuit channel check matrix indicate values of checks associated with respective circuit noise elementary faults of the stabilizer channel. Identifying the one or more severe hook faults further includes receiving a phenomenological channel check matrix of the stabilizer channel as a submatrix of the circuit channel check matrix. Columns of the phenomenological channel check matrix indicate values of checks associated with respective phenomenological noise elementary faults of the stabilizer channel. Identifying the one or more severe hook faults further includes receiving a logical effect matrix of the stabilizer channel and receiving a weight vector that indicates respective probability weights of the elementary faults. Identifying the one or more severe hook faults further includes, based at least in part on the circuit channel check matrix, the logical effect matrix, the phenomenological channel check matrix, and the weight vector, computing one or more column indices of respective columns of the circuit channel check matrix that correspond to the one or more severe hook faults. Computing the one or more column indices includes identifying one or more columns of the circuit channel check matrix that are not columns of the phenomenological channel check matrix. Computing the one or more column indices further includes, for each of the one or more identified columns of the circuit channel check matrix, determining whether the corresponding circuit noise elementary fault is a severe hook fault based at least in part on the probability weight of that circuit noise elementary fault. The one or more processing devices are further configured to output an indication of the one or more severe hook faults. The above features may have the technical effect of identifying faults that may produce uncorrectable errors in the logical outcomes of the stabilizer channel.

"And/or" as used herein is defined as the inclusive or $\lor$, as specified by the following truth table:

| A | B | A $\lor$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
one or more processing devices configured to:
receive a stabilizer channel sequence for use with a quantum computing device, wherein the stabilizer channel sequence includes three or more stabilizer channels;
receive respective fault sets associated with the stabilizer channels;
compute a lower-bound channel distance of the stabilizer channel sequence at least in part by:
computing respective lower-bound channel distances of a plurality of compositions of adjacent pairs of stabilizer channels in the stabilizer channel sequence;
for at least one stabilizer channel of the three or more stabilizer channels, for each of a plurality of partition timestep counts, receiving an indication of whether there exists a time-locality-satisfying partition of the fault set of that stabilizer channel that has that partition timestep count and for which the stabilizer channel is time-local; and
selecting, as the lower-bound channel distance of the stabilizer channel sequence, a lowest value among:
the plurality of lower-bound channel distances of the compositions; and
each of the partition timestep counts that has a respective time-locality-satisfying partition; and
output the lower-bound channel distance.

2. The computing system of claim 1, wherein the fault sets each include:
a respective plurality of elementary faults; and
a plurality of compositions of the elementary faults.

3. The computing system of claim 2, wherein the plurality of elementary faults include:
a plurality of phenomenological noise elementary faults; and
a plurality of circuit noise elementary faults.

4. The computing system of claim 3, wherein:
the plurality of phenomenological noise elementary faults include:
a first plurality of one-qubit Pauli errors respectively associated with idle instructions; and
a first plurality of outcome flips respectively associated with measurement instructions; and
the plurality of circuit noise elementary faults include:
a second plurality of one-qubit Pauli errors respectively associated with single-qubit stabilizer instructions;
a plurality of two-qubit Pauli errors respectively associated with two-qubit stabilizer instructions; and
a second plurality of outcome flips respectively associated with measurement instructions.

5. The computing system of claim 1, wherein each of the time-locality-satisfying partitions fulfills a plurality of time locality criteria, including a criterion that a first channel check set associated with a first partition timestep of a plurality of partition timesteps encodes a function of:
an input code syndrome; and
each of the elementary faults included in a first disjoint subset of the fault set.

6. The computing system of claim 5, wherein the plurality of time locality criteria include a criterion that when no faults occur at the stabilizer channel, the input code syndrome is isomorphic to the first channel check set.

7. The computing system of claim 5, wherein the plurality of time locality criteria include a criterion that a plurality of additional channel check sets associated with subsequent partition timesteps of the plurality of partition timesteps each encode respective functions of the elementary faults included in corresponding disjoint unions of:
   a previous-timestep disjoint subset associated with a previous partition timestep of the plurality of partition timesteps; and
   a current-timestep disjoint subset associated with a current partition timestep of the plurality of partition timesteps.

8. The computing system of claim 5, wherein the plurality of time locality criteria include a criterion that an output code syndrome is a function of:
   the plurality of channel check sets; and
   each of the elementary faults included in a final disjoint subset associated with a final partition timestep of the plurality of partition timesteps.

9. The computing system of claim 2, wherein the one or more processing devices are configured to compute the lower-bound channel distances of the compositions of the adjacent pairs of stabilizer channels at least in part by, for each of the compositions:
   computing a shortest graph-like undetectable non-trivial error of the composition; and
   identifying the length of the shortest graph-like undetectable non-trivial error as the lower-bound channel distance of the composition.

10. The computing system of claim 1, wherein the at least one stabilizer channel is a long stabilizer channel that is time-local for a partition timestep count greater than or equal to the lower-bound channel distance of the stabilizer channel sequence.

11. The computing system of claim 10, wherein the stabilizer channel sequence alternates between:
   one or more long stabilizer channels; and
   one or more short stabilizer channels for which the following compositions have respective lower-bound channel distances equal to the lower-bound channel distance of the stabilizer channel sequence:
      a composition of the short stabilizer channel with a long stabilizer channel included among the one or more long stabilizer channels, and a composition of the long stabilizer channel with the short stabilizer channel; or
      a composition of the short stabilizer channel with a tensor product of the long stabilizer channel and one or more additional long stabilizer channels, and a composition of the tensor product with the short stabilizer channel.

12. The computing system of claim 1, wherein the one or more processing devices are configured to search for the lower-bound channel distance over a predefined range of candidate channel distance values.

13. A method for use with a computing system, the method comprising:
   receiving a stabilizer channel sequence for use with a quantum computing device, wherein the stabilizer channel sequence includes three or more stabilizer channels;
   receiving respective fault sets associated with the stabilizer channels;
   computing a lower-bound channel distance of the stabilizer channel sequence at least in part by:
      computing respective lower-bound channel distances of a plurality of compositions of adjacent pairs of stabilizer channels in the stabilizer channel sequence;
      for at least one stabilizer channel of the three or more stabilizer channels, for each of a plurality of partition timestep counts, receiving an indication of whether there exists a time-locality-satisfying partition of the fault set of that stabilizer channel that has that partition timestep count and for which the stabilizer channel is time-local; and
      selecting, as the lower-bound channel distance of the stabilizer channel sequence, a lowest value among:
         the plurality of lower-bound channel distances of the compositions; and
         each of the partition timestep counts that has a respective time-locality-satisfying partition; and
   outputting the lower-bound channel distance.

14. The method of claim 13, wherein the fault sets each include:
   a respective plurality of elementary faults; and
   a plurality of compositions of the elementary faults.

15. The method of claim 14, wherein the plurality of elementary faults include:
   a plurality of phenomenological noise elementary faults; and
   a plurality of circuit noise elementary faults.

16. The method of claim 14, wherein:
   the plurality of phenomenological noise elementary faults include:
      a first plurality of one-qubit Pauli errors respectively associated with idle instructions; and
      a first plurality of outcome flips respectively associated with measurement instructions; and
   the plurality of circuit noise elementary faults include:
      a second plurality of one-qubit Pauli errors respectively associated with single-qubit stabilizer instructions;
      a plurality of two-qubit Pauli errors respectively associated with two-qubit stabilizer instructions; and
      a second plurality of outcome flips respectively associated with measurement instructions.

17. The method of claim 13, wherein each of the time-locality-satisfying partitions fulfills a plurality of time locality criteria, including:
   a criterion that a first channel check set associated with a first partition timestep of a plurality of partition timesteps encodes a function of:
      an input code syndrome; and
      each of the elementary faults included in a first disjoint subset of the fault set; and
   a criterion that when no faults occur at the stabilizer channel, the input code syndrome is isomorphic to the first channel check set.

18. The method of claim 17, wherein the plurality of time locality criteria include a criterion that a plurality of additional channel check sets associated with subsequent partition timesteps of the plurality of partition timesteps each encode respective functions of the elementary faults included in corresponding disjoint unions of:
   a previous-timestep disjoint subset associated with a previous partition timestep of the plurality of partition timesteps; and
   a current-timestep disjoint subset associated with a current partition timestep of the plurality of partition timesteps.

19. The method of claim 17, wherein the plurality of time locality criteria include a criterion that an output code syndrome is a function of:
the plurality of channel check sets; and
each of the elementary faults included in a final disjoint subset associated with a final partition timestep of the plurality of partition timesteps.

20. A computing system comprising:
one or more processing devices configured to:
receive a stabilizer channel sequence for use with a quantum computing device, wherein the stabilizer channel sequence includes three or more stabilizer channels;
receive respective fault sets associated with the stabilizer channels, wherein the fault sets each include:
a respective plurality of elementary faults; and
a plurality of compositions of the elementary faults;
compute a lower-bound channel distance of the stabilizer channel sequence at least in part by:
computing respective lower-bound channel distances of a plurality of compositions of adjacent pairs of stabilizer channels in the stabilizer channel sequence;
for at least one stabilizer channel of the three or more stabilizer channels, for each of a plurality of partition timestep counts included in a predefined range of candidate channel distance values, receiving an indication of whether there exists a time-locality-satisfying partition of the fault set of that stabilizer channel that has that partition timestep count and for which the stabilizer channel is time-local; and
selecting, as the lower-bound channel distance of the stabilizer channel sequence, a lowest value among:
the plurality of lower-bound channel distances of the compositions; and
each of the partition timestep counts that has a respective time-locality-satisfying partition; and
output the lower-bound channel distance.

* * * * *